United States Patent
Yoo

(10) Patent No.: US 10,304,340 B2
(45) Date of Patent: May 28, 2019

(54) CONTROL DEVICE MOUNTED ON VEHICLE AND METHOD FOR CONTROLLING THE SAME

(71) Applicant: LG ELECTRONICS INC., Seoul (KR)

(72) Inventor: Wonseok Yoo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/593,581

(22) Filed: May 12, 2017

(65) Prior Publication Data

US 2017/0330464 A1   Nov. 16, 2017

(30) Foreign Application Priority Data

May 12, 2016  (KR) .................. 10-2016-0058233

(51) Int. Cl.
| | |
|---|---|
| G08G 1/16 | (2006.01) |
| B60Q 1/52 | (2006.01) |
| B60Q 1/44 | (2006.01) |
| B60Q 1/30 | (2006.01) |
| B60T 7/22 | (2006.01) |

(52) U.S. Cl.
CPC ............... *G08G 1/166* (2013.01); *B60Q 1/30* (2013.01); *B60Q 1/44* (2013.01); *B60Q 1/444* (2013.01); *B60Q 1/525* (2013.01); *B60T 7/22* (2013.01)

(58) Field of Classification Search
None
See application file for complete search history.

(56) References Cited

U.S. PATENT DOCUMENTS

| | | |
|---|---|---|
| 6,357,898 B1 | 3/2002 | Toda et al. |
| 2006/0125616 A1 | 6/2006 | Song |
| 2006/0164221 A1 | 7/2006 | Jensen |
| 2007/0152803 A1 | 7/2007 | Huang et al. |

(Continued)

FOREIGN PATENT DOCUMENTS

| | | |
|---|---|---|
| CN | 103978927 | 8/2014 |
| CN | 104044542 | 9/2014 |

(Continued)

OTHER PUBLICATIONS

'www.valeoservice.com' "Lighting Systems: From light to advanced vision technologies," Valeoscope Technical Handbook 2015, 100 pages.

(Continued)

*Primary Examiner* — Lail A Kleinman
(74) *Attorney, Agent, or Firm* — Fish & Richardson P.C.

(57) ABSTRACT

A control device includes a brake apparatus configured to operate a braking function of a vehicle and at least one rear lamp configured to output visible light to a rear of the vehicle at least in response to an operation of the brake apparatus. The control device also includes a sensing unit configured to sense information related to at least one of the vehicle or a surrounding of the vehicle, and at least one processor. The at least one processor is configured to, based on the information sensed through the sensing unit corresponding to a preset condition and a first vehicle being sensed at the rear of the vehicle, control the at least one rear lamp to output the visible light to the rear of the vehicle in a state in which the brake apparatus is not operated.

19 Claims, 17 Drawing Sheets

(56) References Cited

U.S. PATENT DOCUMENTS

| | | | | |
|---|---|---|---|---|
| 2009/0134987 A1* | 5/2009 | Oltmann | ................ | B60Q 1/302 |
| | | | | 340/435 |
| 2010/0309674 A1 | 12/2010 | Su et al. | | |
| 2014/0129081 A1 | 5/2014 | Ehlgen et al. | | |
| 2014/0301094 A1 | 10/2014 | Ehlgen et al. | | |
| 2015/0175055 A1 | 6/2015 | Falb | | |
| 2015/0239391 A1 | 8/2015 | Foltin | | |
| 2015/0367772 A1* | 12/2015 | Salter | ................ | B60Q 1/26 |
| | | | | 362/466 |
| 2017/0129466 A1* | 5/2017 | Okubo | ................ | B60Q 1/44 |

FOREIGN PATENT DOCUMENTS

| | | |
|---|---|---|
| CN | 105144263 | 12/2015 |
| CN | 105291974 | 2/2016 |
| DE | 102005054497 | 5/2007 |
| DE | 102006019495 | 10/2007 |
| DE | 10-2013-0201850 | 8/2014 |
| EP | 0869031 | 10/1998 |
| EP | 1964717 | 9/2008 |
| FR | 2995269 | 3/2014 |
| JP | 2000062525 | 2/2000 |
| KR | 2019980051488 | 10/1998 |
| KR | 1019990010768 | 2/1999 |
| KR | 10-2013-0104721 | 9/2013 |

OTHER PUBLICATIONS

Extended European Search Report in European Application No. 17169849.1, dated Oct. 18, 2017, 7 pages (with English translation).
Extended European Search Report in European Application No. 17169539.8, dated Nov. 2, 2017, 9 pages (with English translation).

* cited by examiner

CONTROL DEVICE MOUNTED ON VEHICLE AND METHOD FOR CONTROLLING THE SAME

CROSS-REFERENCE TO RELATED APPLICATION

Pursuant to 35 U.S.C. § 119(a), this application claims the benefit of an earlier filing date of and the right of priority to Korean Application No. 10-2016-0058233, filed on May 12, 2016, the contents of which are incorporated by reference herein in its entirety.

TECHNICAL FIELD

This disclosure relates to a control device mounted on a vehicle and a method for controlling the same.

BACKGROUND

A vehicle is an apparatus designed to move a user in a user-desired direction. An example of a vehicle is a car.

A vehicle is typically provided with various types of lighting devices, or lamps. In general, a vehicle includes various vehicle lamps having a lighting function that facilitates the recognition of articles or objects near the vehicle during driving at night, as well as signaling functions that notify those outside the vehicle of a driving state of the vehicle.

For example, a vehicle may include lighting devices that emit light using lamps, such as a headlamp emitting light to a front side of the vehicle to facilitate a driver's view, a brake lamp that illuminates based on operation of a brake of the vehicle, or a turn indicator lamp that indicates a left turn or a right turn of the vehicle.

As another example of lighting devices, a vehicle typically includes reflectors mounted on front and rear sides of the vehicle that reflect light and facilitate recognition of the vehicle from outside.

SUMMARY

Implementations described herein provide a control device and control technique that controls at least one rear lamp of a vehicle based on information sensed through a sensing unit of the vehicle.

In one aspect, a control device may include a brake apparatus configured to operate a braking function of a vehicle, and at least one rear lamp configured to to output visible light to a rear of the vehicle at least in response to an operation of the brake apparatus. The control device may also include a sensing unit configured to sense information related to at least one of the vehicle or a surrounding of the vehicle, and at least one processor. The at least one processor may be configured to, based on the information sensed through the sensing unit corresponding to a preset condition and a first vehicle being sensed at the rear of the vehicle, control the at least one rear lamp to output the visible light to the rear of the vehicle in a state in which the brake apparatus is not operated.

In some implementations, the at least one processor may be further configured to, in the state in which the brake apparatus is not operated, control the at least one rear lamp to change the output of the visible light based on a change in the information sensed through the sensing unit.

In some implementations, the at least one processor may be further configured to control the at least one rear lamp to output the visible light in a first manner based on the information sensed through the sensing unit corresponding to a first condition as the preset condition, and control the at least one rear lamp to output the visible light in a second manner, different from the first manner, based on the information sensed through the sensing unit corresponding to a second condition as the preset condition, different from the first condition.

In some implementations, the at least one processor may be further configured to, based on a probability of collision with the first vehicle sensed at the rear of the vehicle exceeding a reference value, control the at least one rear lamp to output the visible light in the state in which the brake apparatus is not operated.

In some implementations, the at least one processor may be configured to, based on the probability of collision with the first vehicle sensed at the rear of the vehicle exceeding the reference value, control the at least one rear lamp to output the visible light in the state in which the brake apparatus is not operated by controlling, based on the value of the probability of collision with the first vehicle, at least one of an emission angle of visible light of the at least one rear lamp, an emission time point of the at least one rear lamp, a brightness of emitted light from the at least one rear lamp, an emission period of the at least one rear lamp, an emitting direction of the at least one rear lamp, or a color of emitted light from the at least one rear lamp.

In some implementations, the at least one processor may be further configured to control the at least one rear lamp to output the visible light at a first emission time point based on the probability of collision with the first vehicle being a first value, and control the at least one rear lamp to output the visible light at a second emission time point that is earlier than the first emission time point based on the probability of collision with the first vehicle being a second value that is greater than the first value.

In some implementations, the at least one processor may be further configured to control the at least one rear lamp to output the visible light with a first brightness based on the probability of collision with the first vehicle being a first value, and control the at least one rear lamp to output the visible light with a second brightness that is greater than the first brightness based on the probability of collision with the first vehicle being a second value greater than the first value.

In some implementations, the at least one processor may be further configured to calculate a relative distance and a relative speed with the first vehicle through the sensing unit, and determine a time to collision (TTC) based on the calculated relative distance and the calculated relative speed. The probability of collision with the first vehicle may be determined based on the determined time to collision.

In some implementations, the at least one processor may be configured to, in the state in which the brake apparatus is not operated, control the at least one rear lamp to output the visible light based on at least one other vehicle being sensed at both of a front side and a rear side of the vehicle.

In some implementations, the at least one processor may be further configured to determine whether to control the at least one rear lamp to output the visible light in the state in which the brake apparatus is not operated based on a first probability of collision with the first vehicle sensed at the rear of the vehicle and a second probability of collision with a second vehicle sensed at the front of the vehicle.

In some implementations, the at least one processor may be configured to control the at least one rear lamp to output the visible light in the state in which the brake apparatus is not operated, irrespective of the first probability of collision with the first vehicle sensed at the rear of the vehicle, based on the second probability of collision with the second vehicle sensed at the front of the vehicle exceeding a reference value.

In some implementations, the at least one processor may be configured to control the at least one rear lamp to output the visible light in the state in which the brake apparatus is not operated, based on sensing through the sensing unit that light is output from the second vehicle sensed at the front of the vehicle and based on a distance from the first vehicle sensed at the rear of the vehicle being within a reference distance.

In some implementations, the at least one processor may be further configured to generate a forward collision warning based on the second probability of collision with the second vehicle sensed at the front of the vehicle corresponding to a first value, and perform an automatic emergency braking based on the second probability of collision corresponding to a second value greater than the first value. The at least one rear lamp may be configured to output the visible light in response to the automatic emergency braking being performed, and the at least one processor may be configured to, in the state in which the brake apparatus is not operated and based on the first probability of collision with the first vehicle sensed at the rear of the vehicle exceeding a reference value, control the at least one rear lamp to output the visible light at a time point at which the forward collision warning is generated prior to the automatic emergency braking is performed.

In some implementations, the at least one processor may be configured to, in the state in which the brake apparatus is not operated and based on the first probability of collision with the first vehicle sensed at the rear of the vehicle exceeding the reference value, control the at least one rear lamp to output the visible light at the time point at which the forward collision warning is generated by controlling, based on of the first probability of collision with the first vehicle sensed at the rear of the vehicle, at least one of an emission angle of visible light of the at least one rear lamp, an emission time point of the at least one rear lamp, a brightness of emitted light of the at least one rear lamp, an emission period of the at least one rear lamp, an emitting direction of the at least one rear lamp, or a color of emitted light of the at least one rear lamp.

In some implementations, the at least one processor may be configured to, based on the information sensed through the sensing unit corresponding to the preset condition and the first vehicle being sensed at the rear of the vehicle, control the at least one rear lamp to output the visible light to the rear of the vehicle by controlling a brightness of the visible light output from the at least one rear lamp based on a location of the first vehicle and based on a location of an external light source.

In another aspect, a vehicle may include a control device according one or more implementations described above.

In another aspect, a method for controlling a vehicle that includes a sensing unit, a brake apparatus, and at least one rear lamp configured to emit visible light to a rear of the vehicle in response to an operation of the brake apparatus may include sensing, trough the sensing unit, information related to at least one of the vehicle or a surrounding of the vehicle; and controlling the at least one rear lamp to output visible light to the rear of the vehicle in a state in which the brake apparatus is not operated based on the information sensed through the sensing unit corresponding to a preset condition and a first vehicle being sensed at the rear of the vehicle.

In some implementations, controlling the at least one rear lamp to output the visible light to the rear of the vehicle in the state in which the brake apparatus is not operated based on the information sensed through the sensing unit corresponding to the preset condition and the first vehicle being sensed at the rear of the vehicle may include: controlling the at least one rear lamp to change the output of the visible light based on a change in the information sensed through the sensing unit.

In some implementations, controlling the at least one rear lamp to output the visible light to the rear of the vehicle in the state in which the brake apparatus is not operated based on the information sensed through the sensing unit corresponding to the preset condition and the first vehicle being sensed at the rear of the vehicle may include: controlling the at least one rear lamp to output the visible light in a first manner based on the information sensed through the sensing unit corresponding to a first condition as the preset condition, and controlling the at least one rear lamp to output the visible light in a second manner, different from the first manner, based on the information sensed through the sensing unit corresponding to a second condition different from the first condition.

In some implementations, controlling the at least one rear lamp to output the visible light to the rear of the vehicle in the state in which the brake apparatus is not operated based on the information sensed through the sensing unit corresponding to the preset condition and the first vehicle being sensed at the rear of the vehicle may include: controlling the at least one rear lamp to output the visible light, in the state in which the brake apparatus is not operated, based on at least one other vehicle being sensed at both of a front side and a rear side of the vehicle.

Further scope of applicability of the present disclosure will become more apparent from the detailed description given hereinafter. However, it should be understood that the detailed description and specific examples are given by way of illustration only, and that various changes and modifications within the spirit and scope of the disclosure may be made.

DETAILED DESCRIPTION

Figure 1:
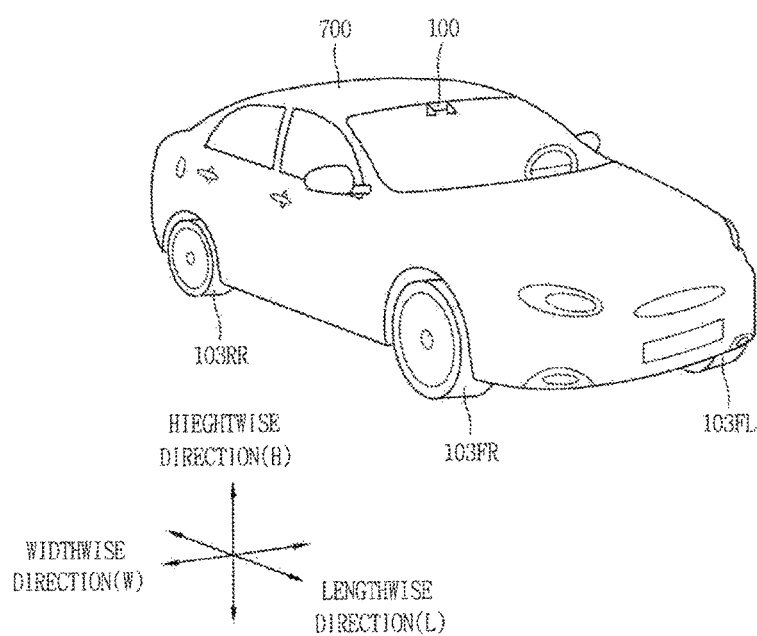
FIG. 1 is a diagram illustrating an example of a vehicle in accordance with some implementations.

A vehicle may include one or more systems, such as an advanced deriving assist system (ADAS), designed to improve convenience and safety while driving a vehicle. In some scenarios, such systems may control one or more components of a vehicle based on information that is sensed inside or outside the vehicle.

Implementations described herein provide a technology that improves safety in driving of a vehicle by controlling one or more lighting devices, or lamps, of a vehicle.

In some implementations, a control device mounted on a vehicle is configured to control an emission of light to a rear side of a vehicle based on information that is sensed inside or outside the vehicle, even when a brake apparatus of the vehicle is not operated. Such implementations may serve various functions. For example, in some scenarios, such a control device may help prevent collisions by proactively illuminating a rear lamp of the vehicle to warn other vehicles of impending dangerous conditions, even if a braking apparatus of the vehicle is not actively engaged. The control device may also be configured to emit visible light to a rear side of the vehicle in an improved or optimized manner even while a brake apparatus is not activated.

Therefore, implementations described herein provide a control device mounted on a vehicle that is configured to control lamps provided on the vehicle in an improved or optimized manner, and a method for controlling the same.

In accordance with some implementations, at least one of the following effects may be achieved in some scenarios.

For example, some implementations may provide a control method configured to help prevent a rear-end collision by warning a rear vehicle by controlling rear lamps to emit light even though a brake apparatus is not operated.

As another example, some implementations may provide rear lamps which may be controlled to output visible light in various manners such that a danger may be notified to a rear vehicle in an improved, optimized, or intuitive manner, and a control device that controls the rear lamps.

As another example, some implementations may provide rear lamps, which enable other vehicles to more intuitively recognize a state of the vehicle or a relationship with the vehicle, by being controlled to output visible light in a different manner according to a type of a condition, such as a preset condition, associated with the emission of the visible light, even without an operation of a brake apparatus, and a control device controlling the rear lamps.

As another example, some implementations may warn a rear vehicle of a risk by activating rear lamps even without an operation of a brake apparatus, when collision probability with the rear vehicle exceeds a reference value.

As another example, some implementations may warn a driver of a rear vehicle in an improved or optimized manner and thus may enhance accident prevention by controlling rear lamps in various, manners based on collision probability exceeding a reference value.

As another example, some implementations may provide a control method that helps prevent a chain collision by controlling rear lamps to output light even without an operation of a brake apparatus, irrespective of collision probability with a first vehicle sensed at a rear of a vehicle disclosed herein, when collision probability with the a vehicle exceeds a reference value.

As another example, some implementations may mitigate accident occurrences by warning a driver of a rear vehicle before a brake apparatus is operated, when brake lamps of a front vehicle sensed at a front of a vehicle are turned on and the rear vehicle sensed at a rear of the vehicle is within a reference distance.

As another example, some implementations may provide a control device that warns a risk to a driver of a rear vehicle in advance or at a particular time point by controlling rear lamps to output light even without an operation of a brake apparatus at a generation time point of a forward collision warning (FCW), when collision probability with the rear vehicle exceeds a reference value. The threshold collision probability at which the rear lamp outputs light may be lower than a threshold collision probably at which automatic emergency braking is performed.

As another example, some implementations may provide a control method that controls rear lamps to output visible light in an improved or optimized manner, considering a surrounding environment, when the rear lamps emit light even without an operation of a brake apparatus.

A vehicle according to some implementations may include cars, motorcycles and the like. Hereinafter, the vehicle will be described based on a car.

The vehicle according to some implementations may be powered by any suitable power source, and may include, for example, an internal combustion engine car having an engine as a power source, a hybrid vehicle having an engine and an electric motor as power sources, an electric vehicle having an electric motor as a power source, and the like.

The vehicle according to some implementations may be an autonomous vehicle.

As described herein, a left side of a vehicle refers to a left side in a driving direction of the vehicle, and a right side of the vehicle refers to a right side in the driving direction. A front side of the vehicle refers to a forward driving direction, and a rear side refers to a backward driving direction.

FIG. 1 is a diagram illustrating an example of a vehicle in accordance with some implementations.

As illustrated in FIG. 1, a vehicle 700 may include wheels 103FR, 103FL, 103RL, . . . , which turn by a power source, and a steering apparatus for adjusting a driving direction of the vehicle 700.

The steering apparatus may include a steering wheel. A user may decide a driving direction of the vehicle 700 using the steering wheel.

A steering input received through the steering apparatus may be transferred to the steering wheel.

The steering apparatus and the steering wheel may be connected to each other electrically or mechanically.

The steering wheels may preferably be the front wheels 103FL and 103FR, but alternatively all of the front wheels 103FL and 103FR and the rear wheels 103RR may operate as the steering wheels.

Figure 2A:
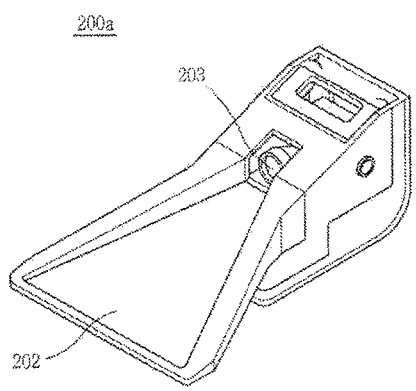
FIGS. 2A to 2C are diagrams illustrating various examples of a camera module included in a control device of a vehicle according to some implementations.
Figure 2B:
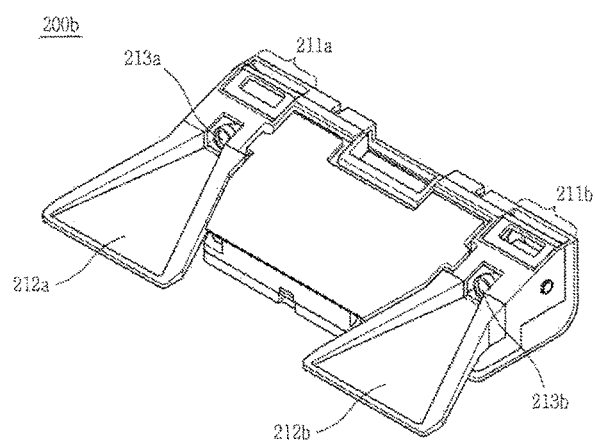
Figure 2C:
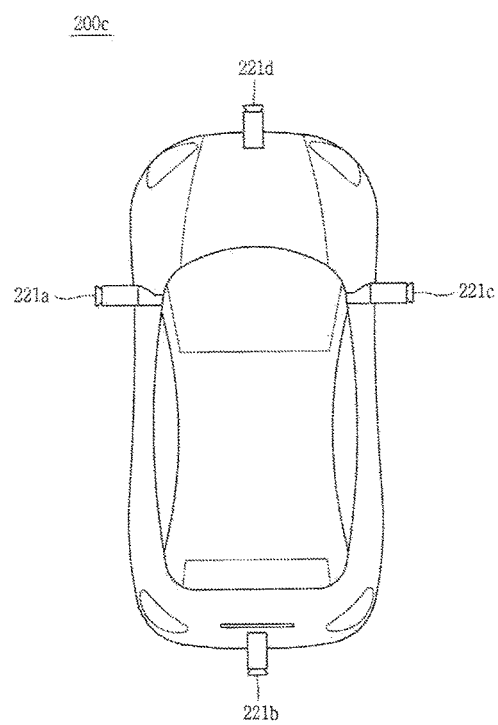

FIGS. 2A to 2C are diagrams illustrating various examples of a camera module included in a control device according to some implementations.

As illustrated in FIG. 2A, a camera unit 200a may include an image sensor (e.g., CCD or CMOS), a lens 203, and a light shield 202 for shielding a part of light incident on the lens 203.

The camera unit 200a may have a structure which is attachable on or detachable from an inner ceiling or a wind shield of the vehicle 700.

The camera unit 200a may acquire surrounding images of the vehicle 700. For example, the camera unit 200a may acquire front or rear images of the vehicle 700. The images acquired through the camera unit 200a may be transmitted to an image processor.

Meanwhile, the image acquired through the camera unit 200a may be referred to as a mono image. Also, the camera unit 200a described with reference to FIG. 2A may be referred to as a mono camera unit or a single camera unit.

Referring to FIG. 2B, a camera unit 200b may include a first camera 211a and a second camera 211b. The first camera 211a may include a first image sensor CCD or CMOS) and a first lens 213a. The second camera 211b may include a second image sensor (e.g., CCD or CMOS) and a second lens 213b.

Meanwhile, the camera unit 200b may include a first light shield 212a and a second light shield 212b for partially shielding light incident on the first lens 213a and the second lens 213b.

Meanwhile, the camera unit 200b may have a structure which is attachable on or detachable from an inner ceiling or a wind shield of the vehicle 700.

The camera unit 200b may acquire surrounding images of the vehicle 700. For example, the camera unit 200b may acquire front or rear images of the vehicle 700. The images acquired through the camera unit 200b may be transmitted to an image processor.

Meanwhile, the images acquired through the first camera 211a and the second camera 211b may be referred to as stereo images.

The camera unit 200b described with reference to FIG. 2B may be referred to as a stereo camera unit.

Referring to FIG. 2C, a camera unit 200c may include a plurality of cameras 221a, 221b 221c and 221d.

For example, the left camera 221a may be disposed within a case surrounding a left side mirror. The right camera 221c may be disposed within a case surrounding a right side mirror. The front camera 221d may be disposed on one area of a front bumper, and the rear camera 221b may be disposed on one area of a trunk lid.

The plurality of cameras 221a, 221b, 221c and 221d may be disposed on the left side, the rear side, the right side and the front side of the vehicle, respectively. Each of the plurality of cameras 221a, 221b, 221c and 221d may include an image sensor (e.g., CCD or CMOS) and a lens.

The camera unit 200c may acquire surrounding images of the vehicle. For example, the camera unit 200c may acquire front, rear, left and right images of the vehicle. The images acquired through the camera unit 200c may be transmitted to an image processor.

Meanwhile, the images acquired through the plurality of cameras 221a, 221b, 221c and 221d of FIG. 2C or a merged image of the acquired images may be referred to as an around view image. Also, the camera unit 200c described with reference to FIG. 2C may be referred to as an around view camera unit.

Figure 3:
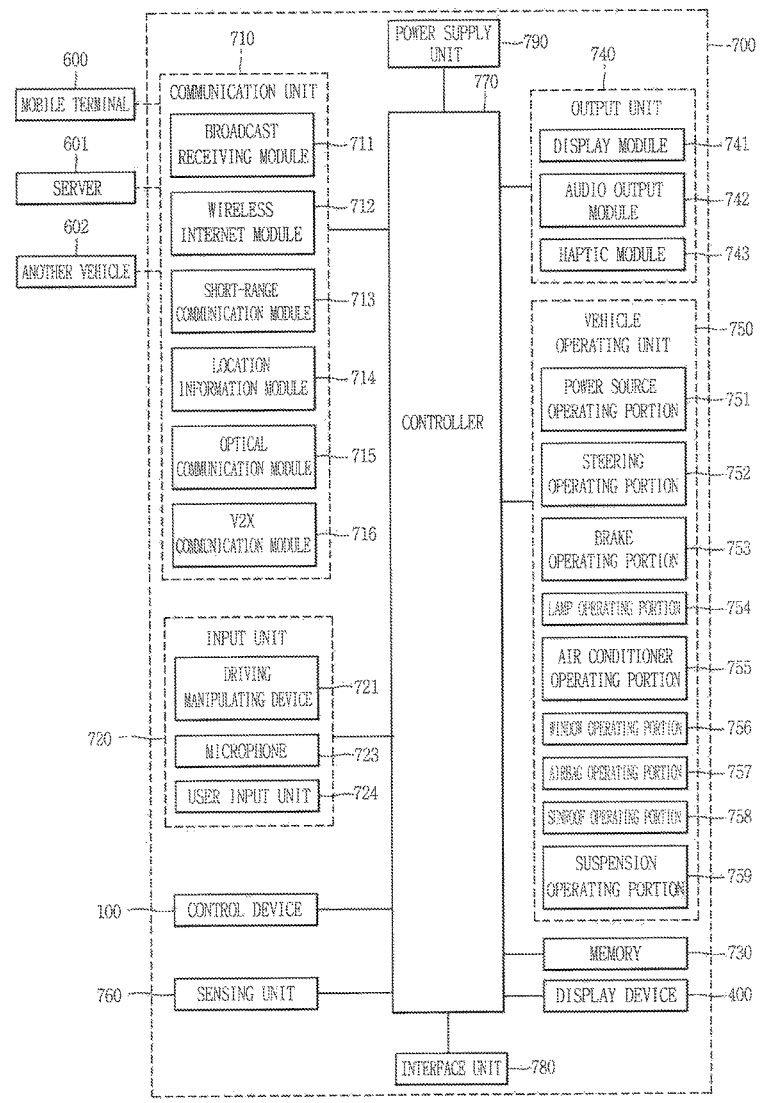
FIG. 3 is a block diagram illustrating an example of a vehicle in accordance with some implementations.

FIG. 3 is a block diagram illustrating a vehicle 700 in accordance with some implementations.

As illustrated in FIG. 3, the vehicle 700 may include a communication unit 710, an input unit 720, a sensing unit 760, an output unit 740, a vehicle operating unit 750, a memory 730, an interface unit 780, a controller 770, a power supply unit 790, a control device 100, a driver status monitoring (DSM) system, and a vehicle display device 400.

The communicating unit 710 may include at least one module allowing wireless communications between the vehicle 700 and a mobile terminal 600, between the vehicle 700 and an external server 601 or between the vehicle 700 and another vehicle 602. Also, the communication unit 710 may include at least one module connecting the vehicle 700 to at least one network.

The communication unit 710 may include a broadcast receiving module 711, a wireless Internet module 712, a short-range communication module 713, a location information module 714, an optical communication module 715, and a V2X communication module 716.

The communication unit 710 may receive various types of information related to the vehicle, and may receive this information from various sources.

For example, the communication unit 710 may receive weather information. The communication unit 710 may receive the weather information from the outside through the broadcast receiving module 711, the wireless Internet module 712 or the V2X communication module 716.

As another example, the communication unit 710 may receive road information, for example related to the driving of the vehicle. The communication unit 710 may recognize a location of the vehicle 700 through the location information module 714, and receive road information corresponding to the location of the vehicle 700 through the wireless Internet module 712 or the V2X communication module 716.

As another example, the communication unit 710 may receive traffic light change information from the external server 601 through the V2X communication module 716. Here, the external server 601 may be a server which is located at a traffic control station which controls traffic conditions.

The broadcast receiving module 711 receives a broadcast signal and/or broadcast associated information from an external broadcast managing entity via a broadcast channel. Here, broadcasting includes radio broadcasting or TV broadcasting.

The wireless Internet module 712 refers to a module that is configured to facilitate wireless Internet access and may be mounted within the vehicle 700 or detachably coupled to the vehicle 700. The wireless Internet module 712 transmits and/or receives wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSDPA), Long Term Evolution (LTE), LTE-advanced (LTE-A) and the like. The wireless Internet module 712 transmits/receives data according to one or more of such wireless Internet technologies, and other Internet technologies as well. The wireless Internet module 712 receives weather information, road traffic condition information (e.g., transport protocol expert group (TPEG)) from the external server 601.

The short-range communication module 713 facilitates short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication module 713 may construct short-range wireless area networks to support short-range communications between the vehicle 700 and at least one external device. For example, the short-range communication module 713 may exchange data with the mobile terminal 600 in a wireless manner. The short-range communication module 713 may receive various types of information, such as weather information, road traffic condition information (e.g., transport protocol expert group (TPEG)), etc., from the mobile terminal 600. If the user gets in the vehicle 700, the user's mobile terminal 600 and the vehicle 700 may be paired with each other automatically or by an application executed by the user.

The location information module 714 is a module for acquiring the location of the vehicle 700, and representatively includes a global positioning system (GPS) module. For example, when the vehicle uses the GPS module, the location of the vehicle may be acquired using signals sent from a GPS satellite.

The optical communication module 715 may include a light transmitting portion and a light receiving portion.

The light receiving portion may receive information by converting a light signal into an electric signal. The light receiving portion may include a photo diode (PD) for receiving light. The photo diode may convert light into an electric signal. For example, the light receiving portion may receive information related to a front vehicle based on light emitted from a light source included in the front vehicle.

The light transmitting portion may include at least one light emitting element for converting an electric signal into a light signal. Here, the light emitting element is preferably a light emitting diode (LED). The light transmitting portion converts an electric signal into a light signal and transmits the light signal to outside. For example, the light transmitting portion may transmit a light signal to outside in a manner of turning on or off the light emitting element corresponding to a predetermined frequency. According to an implementation, the light transmitting portion may include a plurality of light emitting element arrays. According to an implementation, the light transmitting portion may be integrated with lamps provided on the vehicle 700.

For example, the light transmitting portion may be at least one of head lamps, a rear lamp, a brake lamp, a turn indicator lamp and a clearance lamp. For example, the light transmission module 715 may exchange data with another vehicle 602 through light communication.

The V2X communication module 716 is a module for performing wireless communication with the external server 601 or the another vehicle 602. The V2X communication module 716 includes a module which may implement a vehicle-to-vehicle (V2V) communication protocol or a vehicle-to-infra (V2I) communication protocol. The vehicle 700 may perform wireless communications with the external server 601 and the another vehicle 602 through the V2X communication module 716.

The input unit 720 may include a camera, the camera unit 200a, 200b, 200c, a microphone 723 and a user input unit 724.

The microphone 723 may process an external sound signal into electric data. The processed data may be variously used according to a function currently performed in the vehicle 700. The microphone 723 may convert a user's voice command into electric data.

The converted electric data may be transferred to the controller 770.

Meanwhile, according to an implementation, the camera or microphone 723 may alternatively be a component included in the sensing unit 760, other than a component included in the input unit 720.

The user input unit 724 allows the user to input information. When information is input through the user input unit 724, the controller 770 may control an operation of the vehicle 700 to correspond to the input information. The user input unit 724 may include a touch input device or a mechanical input device. According to an implementation, the user input unit 724 may be disposed on one area of the steering wheel. In this instance, the user, such as the driver, may manipulate the user input unit 724 with fingers while holding the steering wheel.

The user input unit 724 may receive a turn signal input.

The sensing unit 760 senses a signal associated with driving and the like. To this end, the sensing unit 760 may include a collision sensor, a wheel sensor, a velocity sensor, a tilt sensor, a weight sensor, a heading sensor, a yaw sensor, an acceleration sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, a rain sensor, an illumination sensor, a tire air pressure sensor, an ultrasonic sensor, a radar, a light detection and ranging (LiADAR) and the like.

Accordingly, the sensing unit 760 may acquire sensing signals with respect to information related to a car collision, an orientation of the vehicle, a location (GPS) of the vehicle, an angel of the vehicle, a driving speed of the vehicle, an acceleration of the vehicle, a tilt of the vehicle, a forward/backward movement of the vehicle, a battery, a fuel, a tire, a vehicle lamp, internal temperature of the vehicle, internal humidity of the vehicle, raining, a turning angle of a steering wheel, ambient brightness, tire air pressure and the like.

Meanwhile, in addition to those sensors, the sensing unit 760 may further include an acceleration paddle sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

Meanwhile, the ultrasonic sensor, the radar or the LiADAR may detect an object and track the object. The ultrasonic sensor, the radar or the LiADAR may calculate a distance from the detected object and a relative speed with respect to the object.

The ultrasonic sensor, the radar or the LiADAR may detect a dangerous situation. A processor included in the ultrasonic sensor, the radar or the LiADAR may detect such dangerous situation based on the distance from the object.

The sensing unit 760 may include a posture detecting sensor. The posture detecting sensor may sense a posture of the vehicle. The posture detecting sensor may generate vehicle posture information.

The posture detecting sensor may include the yaw sensor, the acceleration sensor, the gyro sensor and the tilt sensor.

The sensing unit 760 may include a wind sensor. The wind sensor may detect a direction or speed of the wind. The wind sensor may generate wind direction information or wind speed information. The wind sensor may include an ultrasonic type wind sensor. The wind sensor may measure the speed and direction of the wind using the property that a transfer speed of ultrasonic waves transferred through an air medium increases or decreases due to the wind.

The sensing unit 760 may include a biometric information detecting portion. The biometric information detecting portion detects biometric information related to a passenger for acquisition. The biometric information may include fingerprint information, iris-scan information, retina-scan information, hand geometry information, facial recognition information, and voice recognition information. The biometric information detecting portion may include a sensor for detecting the biometric information related to the passenger. Here, an internal camera and the microphone 723 may operate as sensors. The biometric information detecting portion may acquire hand geometry information and facial recognition information through the internal camera.

The output unit 740 is configured to output information processed in the controller 770, and may include a display module 741, an audio output module 742 and a haptic output module 743.

The display module 741 may output information processed in the controller 770. For example, the display module 741 may output vehicle-related information. Here, the vehicle-related information may include vehicle control information for a direct control of the vehicle, or vehicle driving assist information for guiding the driving of a driver of the vehicle. Also, the vehicle-related information may include vehicle status information notifying a current status of the vehicle or vehicle driving information related to a driving state of the vehicle.

The display module 741 may include at least one of a liquid crystal display (LCD), a thin film transistor-liquid crystal display (TFT-LCD), an organic light emitting diode (OLED), a flexible display, a 3-dimensional (3D) display, an e-ink display, and combinations thereof.

The display module 741 may be layered or integrated with a touch sensor to implement a touch screen. The touch screen may function as the user input unit 724 providing a user input interface between the vehicle 700 and the user and simultaneously provide an output interface between the vehicle 700 and the user. In this instance, the display module 741 may include a touch sensor which senses a touch input applied to the display module 741, so as to receive a control command applied in a touching manner. By using this structure, when a touch is applied to the display module 741, the touch sensor may sense the touch, and the controller 770 may generate a control command corresponding to the touch. Contents input by the touching method may be characters, numbers, instructions in various modes, or menu items to be designated.

Meanwhile, the display module 741 may include a cluster which allows the driver to check vehicle status information or vehicle driving information while driving the vehicle. The cluster may be located on a dashboard. In this instance, the driver may check information output on the cluster while viewing the front of the vehicle.

Meanwhile, according to an implementation, the display module 741 may be implemented as a head up display (HUD). When the display module 741 is implemented as the HUD, information may be output through a transparent display provided on a wind shield. Or, the display module 741 may be provided with a projection module and thus output information through an image projected on the wind shield.

The audio output module 742 converts an electric signal sent from the controller 770 into an audio signal and outputs the audio signal. To this end, the audio output module 742 may include a speaker and the like. The audio output module 742 may output sound corresponding to an operation of the user input unit 724.

The haptic output module 743 generates a tactile output. For example, the haptic output module 743 may vibrate a steering wheel, a safety belt or a seat to make the user recognize such output.

The vehicle operating unit 750 may control operations of various vehicle devices. The vehicle operating unit 750 may receive a control signal from the steering apparatus. The vehicle operating unit 750 may control each device based on the control signal.

The vehicle operating unit 750 may include a power source operating portion 751, a steering operating portion 752, a brake operating portion 753, a lamp operating portion 754, an air conditioner operating portion 755, a window operating portion 756, an airbag operating portion 757, a sunroof operating portion 758, and a suspension operating portion 759.

The power source operating portion 751 may perform an electronic control for the power source within the vehicle 700.

For example, when a fossil fuel-based engine is a power source, the power source operating portion 751 may perform an electronic control for the engine. Accordingly, an output torque or the like of the engine may be controlled. When the power source operating portion 751 is the engine, the engine output torque may be limited according to the control of the controller 770, thereby limiting speed of the vehicle.

As another example, when an electric motor is a power source, the power source operating portion 751 may perform a control for the motor, thereby controlling a rotation speed, torque and the like of the motor.

The power source operating portion 751 may receive an acceleration control signal from the steering apparatus or the control device 100. The power source operating portion 751 may control the power source according to the received acceleration control signal.

The steering operating portion 752 may perform an electronic control for the steering apparatus within the vehicle 700. Accordingly, a moving, driving, or ongoing direction of the vehicle may be changed.

The steering operating portion 752 may receive a steering control signal from the steering apparatus or the control device 100.

The steering operating portion 752 may control the steering apparatus to be steered according to the received steering control signal.

The brake operating portion 753 may perform an electronic control for the brake apparatus 153 within the vehicle 700. For example, the braking operating portion 753 may control an operation of a brake or brake apparatus provided on a wheel to reduce speed of the vehicle 700 or stop the vehicle 700. As another example, the brake operating portion 753 may differently control operations of brakes disposed on a left wheel and a right wheel to adjust a moving direction of the vehicle 700 to left or right. The brake operating portion 753 may receive a deceleration control signal from the steering apparatus or the control device 100. The brake operating portion 753 may control the brake apparatus according to the received deceleration control signal.

The lamp operating portion 754 may control lamps disposed within or outside the vehicle to be turned on or off. Also, the lamp operating portion 754 may control intensity, direction and the like of light. For example, the lamp operating portion 754 may control turn indicator lamps, brake lamps and the like.

The air conditioner operating portion 755 may perform an electronic control for an air conditioner within the vehicle 700. For example, when internal temperature of the vehicle is high, the air conditioner operating portion 755 may control the air conditioner to be activated to supply cold air into the vehicle.

The window operating portion 756 may perform an electronic control for a window apparatus within the vehicle 700. For example, the window operating portion 756 may control left and right windows provided on side surfaces of the vehicle to be open or closed.

The airbag operating portion 757 may perform an electronic control for an airbag apparatus within the vehicle 700. For example, the airbag operating portion 757 may control an airbag to be deployed upon exposed to danger.

The sunroof operating portion 758 may perform an electronic control for a sunroof apparatus within the vehicle 700. For example, the sunroof operating portion 758 may control the sunroof to be open or closed.

The suspension operating portion 759 may perform an electronic control for a suspension apparatus within the vehicle 700. For example, when a bump is present on a road surface, the suspension operating portion 759 may control the suspension apparatus to reduce vibration transferred to the vehicle 700. The suspension operating portion 759 may receive a suspension control signal from the steering apparatus or the control device 100. The suspension operating portion 759 may control the suspension apparatus according to the received suspension control signal.

The memory 730 is electrically connected to the controller 770. The memory 730 may store basic data for units, control data for controlling operations of units and input/output data. The memory 730 may store various data for overall operations of the vehicle 700, such as programs for processing or controlling the controller 770.

The memory 730 may include one or more types of storage mediums including a flash memory type, a hard disk type, a solid state disk (SSD) type, a silicon disk drive (SDD) type, a multimedia card micro type, a card-type memory (e.g., SD or XD memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The vehicle 700 may also be operated in relation to a network storage device that performs the storage function of the memory 730 over a network, such as the Internet.

The memory 730 may be integrated with the controller 770.

The interface unit 780 may serve as a path allowing the vehicle 700 to interface with various types of external devices connected thereto. For example, the interface unit 780 may be provided with a port connectable with the mobile terminal 600, and connected to the mobile terminal 600 through the port. In this instance, the interface unit 780 may exchange data with the mobile terminal 600.

Meanwhile, the interface unit 780 may serve as a path for supplying electric energy to the connected mobile terminal 600. When the mobile terminal 600 is electrically connected to the interface unit 780, the interface unit 780 supplies electric energy supplied from the power supply unit 790 to the mobile terminal 600 according to the control of the controller 770.

The interface unit 780 may serve as a path allowing the vehicle 700 to interface with various types of external devices connected thereto. The interface unit 780 may include any of wired or wireless ports, external power supply ports, wired or wireless data ports, memory card ports, ports for connecting a device having an identification module, audio input/output (I/O) ports, video I/O ports, earphone ports, and the like. In some cases, the vehicle 700 may perform assorted control functions associated with a connected external device, in response to the external device being connected to the interface unit 780.

The controller 770 may control an overall operation of each unit, apparatus or component within the vehicle 700.

The controller 770 may be referred to as an electronic control unit (ECU). The controller 770 may be implemented in hardware configuration by using at least one of digital signal processors (DSPs), digital signal processing devices (DSPDs), programmable logic devices (PLDs), field programmable gate arrays (FPGAs), processors, controllers, micro controllers, microprocessors, and electric units performing other functions.

The power supply unit 790 may supply power required for operations of components according to the control of the controller 770. Specifically, the power supply unit 790 may receive power supplied from an internal battery of the vehicle 700.

The steering apparatus or the control device 100 may exchange data with the controller 770. Various information, data or control signals generated in the steering apparatus may be output to the controller 770. The steering apparatus may be the control device described with reference to FIGS. 1 to 3.

A driver status monitoring (DSM) system is a system of sensing a driver's status and controlling the vehicle 700 according to the driver's status. The DSM system may include an input device such as an internal camera, a microphone and the like.

The DSM system may monitor the driver's status, such as whether the driver is looking at the front, dozing off, eating food, manipulating a device or the like. Also, the DSM system may sense the driver's concentration on driving during the driving.

The DSM system may include a photoplenthysmogram (PPG) sensor. The PPG sensor may be disposed on one area of the steering wheel which is contactable with the user's body, for example the driver's body. The PPG sensor may be disposed on one area of a steering wheel rim. The DSM system may acquire a biometric signal of the driver through the PPG sensor and analyze the acquired biometric signal.

For example, the DSM system may acquire a biometric signal and generate driver condition information as the driver status information.

For example, the DSM system may acquire biometric information and generate information related to the driver's excited condition as the driver status information.

For example, the DSM system may analyze a driver image acquired through the internal camera, and generate information related to the driver's dozing state as the driver status information.

For example, the DSM system may analyze a driver image acquired through the internal camera, and generate information related to the driver's device manipulating state.

The DSM system may provide the driver status information to the steering apparatus or the control device 100.

The vehicle display device 400 may exchange data with the controller 770. The controller 770 may receive navigation information from the vehicle display device 400 or a separate navigator. Here, the navigation information may include information related to a preset destination, path information based on the destination, map information related to driving of the vehicle, or vehicle location information.

Meanwhile, the vehicle 700 disclosed herein may include the control device 100. The control device 100 may control various lamps provided in the vehicle 700.

The various lamps, for example, may include head lamps configured to emit visible light to the front of the vehicle, rear lamps configured to emit visible light to the rear of the vehicle, turn indicator lamps and the like.

The rear lamp 154 may be configured by combination of at least one of the head lamp, brake lamps emitting light when the brake apparatus 153 operates, and the turn indicator lamps. The rear lamp may be referred to as a rear combination lamp (portion, module), in view of being configured by the combination of lamps performing various functions.

The control device 100 disclosed herein may be an independent device (structure or component) that controls at least one component (e.g., the lamps, the brake apparatus, the brake operating portion 753, the lamp operating portion 754 and the like) provided in the vehicle 700.

The control apparatus 100 may generally control various units, components, apparatuses, and the like described in FIG. 3. In some implementations, the control device 100 may be the controller 770 of the vehicle 700. In such scenarios, functions and controls described in relation to the control device 100 may be performed by the controller 770 of the vehicle 700.

Also, the control device 100 may be referred to as a lamp control device, a vehicle control device, a vehicle assist device or the like, from the perspective of controlling the lamps provided on the vehicle.

Meanwhile, for the sake of explanation in this specification, description will be given under assumption that the control device 100 is a single independent device (structure or component).

Hereinafter, the control device 100 according to some implementations will be described with reference to FIG. 4. The following description will be applied to a case where the control device 100 provided in the vehicle is configured as the independent device.

Figure 4:
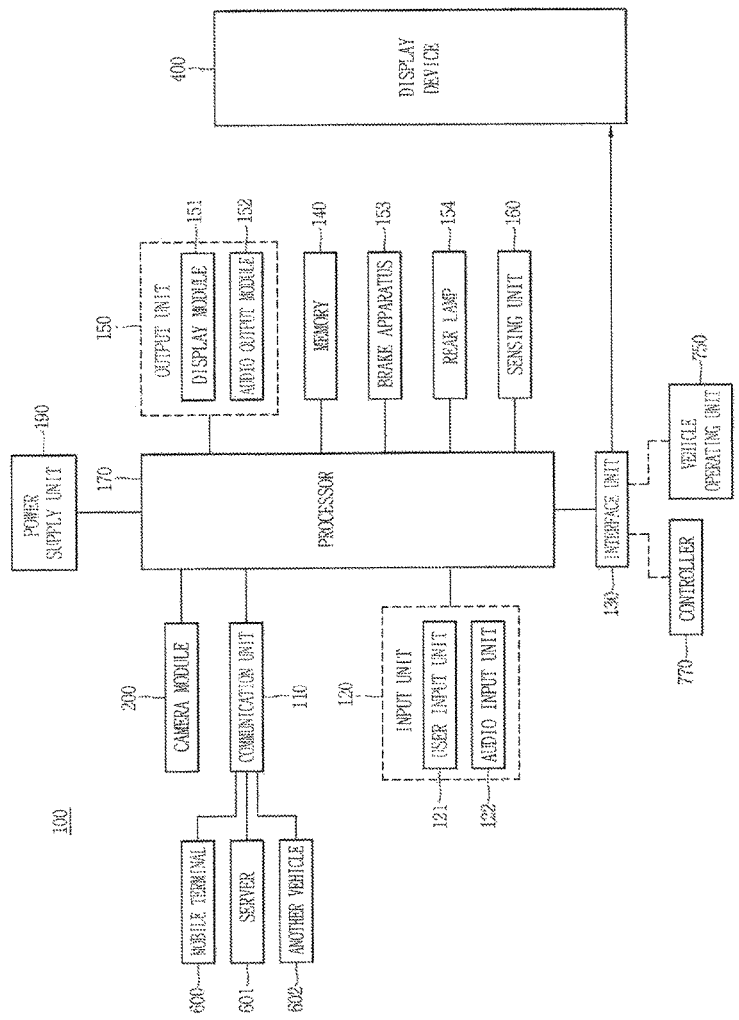
FIG. 4 is a block diagram illustrating an example of a control device of a vehicle in accordance with some implementations.

FIG. 4 is a block diagram illustrating a control device in accordance with some implementations.

As illustrated in FIG. 4, the control device 100 according to some implementations may include a camera module 200, a communication unit 110, an input unit 120, an interface unit 130, a memory 140, an output unit 150, a brake apparatus 153, rear lamps 154, a sensing unit 160, a processor 170 and a power supply unit 190.

The camera module 200 (or camera) may acquire surrounding images of the vehicle.

Data, signals or information generated in the camera module 200 are transmitted to the processor 170.

The camera module 200 may be the camera unit 200a, 200b, 200c illustrated in FIGS. 2A to 2C.

For example, the camera module 200 may be the mono camera unit 200a. The mono camera unit 200a may acquire a mono image as the surrounding image of the vehicle.

For example, the camera module 200 may be the stereo camera unit 200b. The stereo camera unit 200b may acquire a stereo image as the surrounding image of the vehicle.

For example, the camera module 200 may be an around view camera unit 200c. The around view camera unit 200c may acquire an around view image as the surrounding image of the vehicle.

The communication unit 110 may exchange data with the mobile terminal 600, the server 601 or the another vehicle 602 in a wireless manner. Specifically, the communication unit 110 may exchange data with the mobile terminal of the driver of the vehicle in a wireless (or wired) manner. Examples of such wireless communication method may include various communication methods, such as Bluetooth, WiFi direct, WiFi, APiX, NFC, etc.

The communication unit 110 may receive weather information, road traffic condition information, for example, TPEG information from the mobile terminal 600 or the server 601. Meanwhile, the vehicle assist device 100 may also transmit recognized real-time information to the mobile terminal 600 or the server 601.

Meanwhile, when the user gets in the vehicle, the user's mobile terminal 600 and the control device 100 may perform pairing with each other automatically or by the user's execution of an application. In view of this, the control device 100 may be referred to as a vehicle assist device.

The communication unit 110 may receive traffic light change information from the external server 601.

Here, the external server 601 may be a server located in a traffic control station for controlling traffic.

The communication unit 110 may receive weather information from the external server 601. Here, the external server 601 may be a server of an organization or an operator providing the weather information. For example, the communication unit 110 may receive, for each region, fine dust information, smog information or yellow dust information from the external server 601.

The input unit 120 may include a user input unit 121 and an audio input unit 122.

The user input unit 121 may include a plurality of buttons or a touch screen. The user input unit 121 may turn on the control device 100 through the plurality of buttons or the touch screen. The user input unit 121 may also perform various input operations.

The audio input unit 122 may receive the user's voice input. The audio input unit 122 may include a microphone switching the voice input into an electric signal. The audio input unit 122 may receive the user's voice to turn on the vehicle assist device 100. The user input unit 121 may also perform other various input operations.

The input unit 120 may be the input unit 720 illustrated in FIG. 3.

The interface unit 130 may allow for receiving information, signals or data, or externally transmitting information, signals or data processed or generated in the processor 170. To this end, the interface unit 130 may perform data communication with the controller 770, the vehicle display device 400, the sensing unit 760, the vehicle driving portion 750 and the like provided in the vehicle, through wired or wireless communication technologies.

The interface unit 130 may allow for receiving navigation information through data communications with the controller 770, the vehicle display device 400 or a separate navigator.

Here, the navigation information may include information related to a preset destination, path information based on the destination, map information related to driving of the vehicle, or vehicle location information. Meanwhile, the navigation information may include location information related to the vehicle on a road.

Meanwhile, the interface unit 130 may allow for receiving sensor information from the controller 770 or the sensing unit 160, 760.

Here, the sensor information may include information related to at least one of an orientation of the vehicle, a location (GPS) of the vehicle, an angel of the vehicle, a driving speed of the vehicle, an acceleration of the vehicle, a tilt of the vehicle, a forward/backward movement of the vehicle, a battery, a fuel, a tire, a vehicle lamp, internal temperature of the vehicle, external temperature of the vehicle, internal humidity of the vehicle, external humidity of the vehicle, and raining.

The sensor information may be acquired from a heading sensor, a yaw sensor, a gyro sensor, a position module, a vehicle forward/backward movement sensor, a wheel sensor, a vehicle velocity sensor, a vehicle tilt detecting sensor, a battery sensor, a fuel sensor, a tire sensor, a steering sensor by a turn of a handle, a vehicle internal temperature sensor, a vehicle external temperature sensor, a vehicle internal humidity sensor, a vehicle external humidity sensor, a rain sensor, a GPS sensor and the like.

Meanwhile, among those sensor information, the vehicle orientation information, the vehicle location information, the vehicle angle information, vehicle velocity information, the vehicle tilt information and the like, all related to the driving of the vehicle, may be referred to as vehicle driving information.

The interface unit 130 may receive passenger information. Here, the passenger information may be information received through an input device. Or, the passenger information may be information acquired through a passenger detecting sensor (e.g., a camera capturing a passenger's state). Or, the passenger information may be information received from a mobile terminal belonging to the passenger.

The memory 140 may store various data for an overall operation of the control device 100, such as programs for processing or control of the processor 170.

The memory 140 may store data for checking a predetermined object. For example, the memory 140 may store information for checking (or verifying) what the object corresponds to, according to a preset algorithm, when the predetermined object is detected from an image acquired through the camera module 200.

Meanwhile, the memory 140 may be various storage media, such as ROM, RAM, EPROM, a flash drive, a hard drive and the like, in hardware configuration. The memory 140 may be integrally formed with the processor 170.

The output unit 150 may generate a visual, audible or tactile output, and may include at least one of the display unit 151, the audio output module 152, the haptic module and an optical output module. The display unit 151 may implement a touch screen as being layered or integrated with a touch sensor. The touch screen may function as the user input unit 121 providing a user input interface between the control device 100 and the user and simultaneously providing an output interface between the control device 100 and the user.

The output unit 150 of the control device 100 may be the output unit 740 illustrated in FIG. 3, or a separate device.

Similarly, the display unit 151 may also be the display device 400 illustrated in FIG. 3, or a separate device.

The brake apparatus 153 may be a hardware device for reducing velocity of the vehicle 700. The brake apparatus 153 may be provided in the vehicle 700. The brake apparatus 153 may be controlled by at least one of the brake operating portion 753 and the controller 770 illustrated in FIG. 3.

The rear lamps 154 may be provided on the rear of the vehicle 700. The rear lamps 154 may be configured as various light sources. For example, the rear lamps 154 may emit light by a light source including at least one of a bulb, a micro LED, a matrix LED, an OLED and a laser diode.

For example, the rear lamps 154 may be configured to output visible light to the rear of the vehicle 700, in response to the brake apparatus 153 being operated (activated).

The brake apparatus 153 and the rear lamps 154 are preferably provided at the vehicle 700. Meanwhile, for the sake of explanation, the brake apparatus 153 and the rear lamps 154 will be described as being included in the control device 100.

The control device 100 according to some implementations may include a sensing unit 160. Here, the sensing unit 160 may be the sensing unit 760 illustrated in FIG. 3. The sensing unit 160 may be the sensing unit 760 itself provided in the vehicle, or a separate component.

Even when the sensing unit 160 is the separate component, the structure of the sensing unit 760 provided in the vehicle will be applied equally/similarly.

For the sake of explanation, description will be given under assumption that the sensing unit 160 is included in the control device 100. Also, the same/like description of the sensing unit 760 provided in the vehicle and the use of the sensing unit 760 provided in the vehicle will be applied to description of the sensing unit 160 and the use of the sensing unit 160.

The processor 170 may control an overall operation of each unit within the control device 100. The processor 170 may be electrically connected to each unit, component or apparatus within the control device 100. In some implementations, the processor 170 may refer to one or more processors that perform the control operations.

The processor 170 may process surrounding images acquired through the camera module 200. The processor 170 may process the vehicle surrounding image into a computer vision-based signal.

The processor 170 may merge a plurality of images received from the around view camera module 200c of FIG. 2C. Here, the plurality of images may be images received from the plurality of cameras 221a, 221b, 221c and 221d of FIG. 2C. The processor 170 may generate an around view image or an omnidirectional image by merging the plurality of images. For example, the around view image may be a top view image.

The processor 170 may detect at least one object based on each of the images acquired from the plurality of cameras 221a, 221b, 221c and 221d of FIG. 2C). Or, the processor 170 may detect at least one object based on the around view image.

Also, the processor 170 may detect at least one object based on the omnidirectional image. The lamp control device 100 may track a movement of the detected object.

During the detection of the object, the processor 170 may perform a lane detection (LD), a vehicle detection (VD), a pedestrian detection (PD), a brightspot detection (BD), a traffic sign recognition (TSR), a road surface detection, a structure detection and the like.

For example, the processor 170 may detect an object based on at least one of intensity, a color, histogram, a feature point, a shape, a space position and a motion.

The processor 170 may verify the detected object. The processor 170 may verify the detected object using an identifying method using a neural network, a support vector machine (SVM) method, an identifying method by AdaBoost using a Haar-like characteristic, a histograms of oriented gradients (HOG) technology, or the like. In this instance, the processor 170 may perform such verification by comparing the object detected from the surrounding image of the vehicle with data stored in the memory 140.

The processor 170 may track the verified object. The processor 170 may calculate a motion or a motion vector of the verified object and track a movement and the like of the object based on the calculated motion or motion vector.

Meanwhile, the processor 170, for hardware implementation, may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein.

The power supply unit 190 may supply power required for an operation of each component according to the control of the processor 170. Specifically, the power supply unit 190 may receive power supplied from an internal battery of the vehicle and the like.

As aforementioned, the control device 100 described in FIG. 4 may be a component or device independently provided in the vehicle 700 or the controller 770 itself.

The control device 100 which may include at least one of those components may control various lamps provided on the vehicle.

Figure 5:
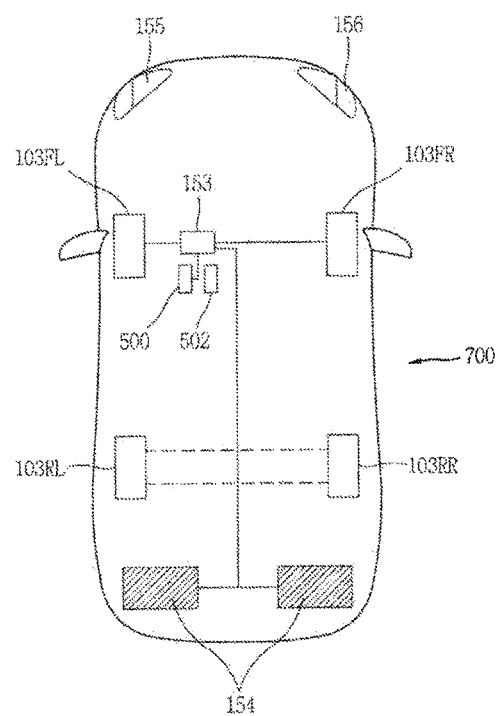
FIG. 5 is a diagram illustrating an example of lamps and a brake apparatus provided on a vehicle in accordance with some implementations.

FIG. 5 is a diagram illustrating an example of lamps and a brake apparatus provided in a vehicle in accordance with some implementations.

As illustrated in FIG. 5, the vehicle 700 disclosed herein may include lamps 154, 155 and 156 controlled by the control device 100 (or the controller 770), and a brake apparatus 153.

For example, the lamps may include head lamps 155 provided on a front of the vehicle and emitting (outputting) visible light to the front of the vehicle, rear lamps 154 provided on a rear of the vehicle and emitting visible light to the rear of the vehicle, and turn indicator lamps 156.

The head lamps 155 and the turn indicator lamps 156 are irrespective of some implementations, so detailed description thereof will be omitted.

Meanwhile, the vehicle 700 disclosed herein may include the brake apparatus 153 which brakes a movement of the vehicle.

In detail, the brake apparatus 153 may operate a brake shoe (or pad) provided on at least one of front wheels 103FL, 103FR and rear wheels 103RL, 103RR of the vehicle and generate frictional force (clamping force or braking force) between the at least one wheel of the vehicle and the brake shoe (or pad). When the brake apparatus 153 is operated, the movement of the vehicle may be braked.

For example, the brake apparatus 153 may be driven (or operated) when a brake paddle 500 is pressed. In detail, when the brake paddle 500 is pressed, the brake apparatus 153 may operate the brake shoe through a brake circuit. In this instance, the brake apparatus 153 may be a hydraulic brake which acquires the braking force using oil pressure.

The hydraulic brake is understood by a publicly known technology, so detailed description thereof will be omitted.

As another example, when a driving state of the vehicle is determined as an emergency, the control device 100 (or the vehicle 770 of the vehicle) may operate the brake apparatus 153, even though the brake paddle 500 is not pressed. This operation may correspond to an automatic emergency braking (AEB) system (or function).

Here, the emergency may refer to a case where collision probability between an object detected at the front (e.g., a front vehicle) and the vehicle 700 exceeds a reference value (e.g., a preset value).

For example, the processor 170 of the control device 100 may detect vehicle-related information (or a driving state of the vehicle) (e.g., a driving speed of the vehicle, a weight of the vehicle or a maximum braking force of the vehicle), and surrounding information related to the vehicle (e.g., a state of a road surface, the weather, a distance from a front vehicle, a driving speed of a front vehicle, etc.) using the sensing unit 160.

Afterwards, the processor 170 may calculate the collision probability of the vehicle (e.g., a time to collision (TTC)) on the basis of the driving state of the vehicle and the surrounding information related to the vehicle.

When the collision probability of the vehicle is more than the reference value (or when the TTC is shorter than a reference time), the processor 170 may operate (activate) the brake apparatus 153 even though the brake paddle 500 is not pressed. The reference value (or the reference time) may be changed by the user or preset at the time of producing a product (the vehicle, the control device, etc.).

In this manner, the function (or system) of driving (or operating) the brake apparatus 153 when the collision probability of the vehicle is more than the reference value, even though the brake paddle 500 is not pressed, may be referred to as an AEB system.

The AEB system is one of core functions of an adaptive driving assistance system (ADAS) and may increase safety of the vehicle.

When the brake apparatus 153 is operated, the rear lamps 154 may output visible light to the rear of the vehicle. For example, even when the brake apparatus 153 is operated by the AEB system, as well as being operated in response to the brake paddle 500 being pressed, the rear lamps 154 may emit (output, irradiate) the visible light to the rear of the vehicle.

Also, the brake apparatus 153 may include at least one of a hydraulic brake that is operated by the brake paddle 500, an engine brake that decelerates the vehicle by increasing an engine speed (engine RPM) using friction between the engine and a gearbox, or a parking brake.

The operation in which the rear lamps 154 emit light in response to the operation of the brake apparatus 153 may be performed under the control of the processor 170 of the control device 100 (or the controller 770).

Also, in hardware (or electric) configuration, the vehicle 700 disclosed herein may be pre-designed in a manner that the rear lamps 154 emit visible light to the rear of the vehicle without the control of a separate component (e.g., the controller 770 or the control device 100 (processor 170)).

In some implementations, the control device 100 disclosed herein may control the rear lamps 154 by an improved process to enhance safety of the vehicle. The improved control method may help prevent a rear-end collision or chain collision or multi-vehicle rear-end collision. Examples of such implementations will be described with reference to the accompanying drawings.

Figure 6:
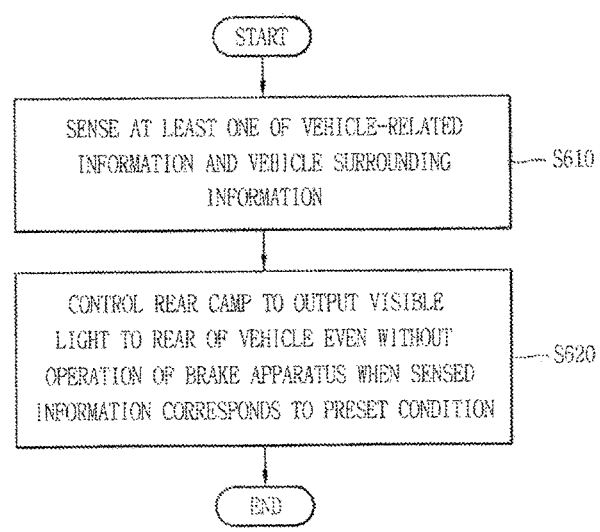
FIG. 6 is a flowchart illustrating an example of a control process in accordance with some implementations.
Figure 7:
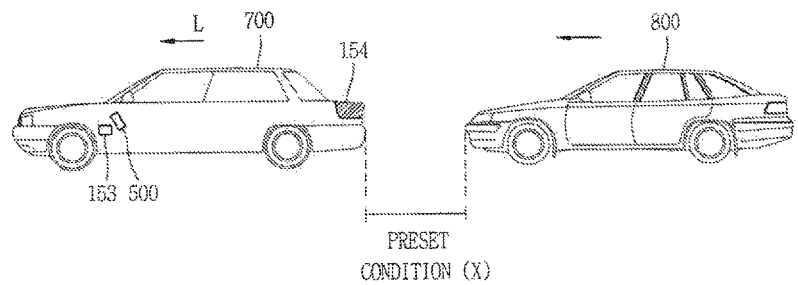
FIG. 7 is a diagram illustrating examples of the control of FIG. 6.
Figure 7:
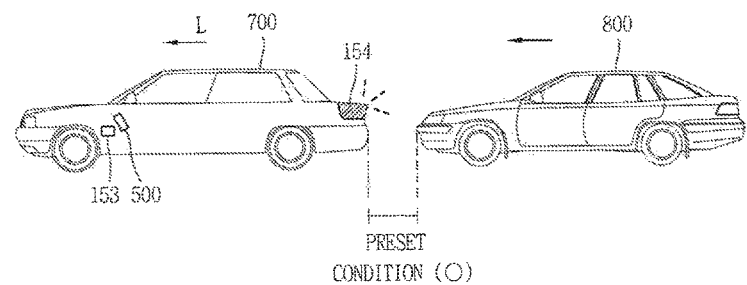

FIG. 6 is a flowchart illustrating an example of a control method in accordance with some implementations, and FIG. 7 is a diagram illustrating the control method of FIG. 6.

As aforementioned, the control device 100 disclosed herein may include the brake apparatus 153 for braking the movement of the vehicle, and the rear lamps 154 emitting visible light to the rear of the vehicle 700 when the brake apparatus 153 is activated.

Also, the control device 100 disclosed herein may include the sensing unit 160 that senses at least one of vehicle-related information and surrounding information related to the vehicle. The sensing unit 160 may be a sensing unit provided in the control device 100 or the sensing unit 760 provided in the vehicle 700.

The vehicle-related information may be information related to driving of the vehicle (or a driving state of the vehicle). For example, the vehicle-related information may include a driving speed of the vehicle, a weight of the vehicle, a number of persons in the vehicle, braking force of the vehicle, the maximum braking force of the vehicle and the like.

The surrounding information related to the vehicle, for example, may be a state (frictional force) of a road surface on which the vehicle is currently moving, a distance from a front (or rear) vehicle, a relative speed of a front (or rear) vehicle, a curvature of a curve when a driving lane is curved.

In some implementations, at least one of the vehicle-related information and the vehicle surrounding information is sensed using the sensing unit 160 (S610).

In detail, the processor 170 may detect at least one of the vehicle-related information and the vehicle surrounding information by controlling the sensing unit 160 while the vehicle is driven.

The detection may be executed always while the vehicle is driven, with a predetermined time interval, or when an object is detected near the vehicle, and the like, but implementations are not limited to this.

The processor 170 may calculate the shortest braking distance of the vehicle 700 using at least one of the detected vehicle-related information and vehicle surrounding information. For example, the processor 170 may calculate the shortest braking distance of the vehicle on the basis of the weight of the vehicle, the driving speed of the vehicle, the maximum braking force of the vehicle and the state of the road surface.

The processor 170 may also calculate the collision probability of the vehicle.

The collision probability of the vehicle may be collision probability with a rear vehicle.

The processor 170 may calculate a relative speed with the rear vehicle, and a relative distance with the rear vehicle through the sensing unit 160. Afterwards, the processor 170 may decide the time to collision (TTC) on the basis of the calculated relative distance and relative speed.

The collision probability may be decided based on the TTC.

The TTC may be calculated using the relative speed and the relative distance with the rear vehicle. Also, the TTC may be changed (decided) based on at least one of the driving speed of the vehicle, the weight of the vehicle, the braking force (maximum braking force) of the vehicle, the state of the driving road surface and the shortest braking distance of the vehicle, in addition to the relative speed and the relative distance.

The collision probability may include collision probability with a front rear vehicle, as well as the collision probability with the rear vehicle. For example, the processor 170 may decide the collision probability (or TTC) with the front vehicle based on the relative speed and relative distance with the front vehicle.

The processor 170 may decide the collision probability with the front vehicle or the collision probability with the rear vehicle based on at least one of the vehicle-related information and the vehicle surrounding information detected through the sensing unit.

Also, the collision probability may include departure probability from a currently-driving lane during moving along a curve, as well as the collision probabilities with the front and rear vehicles. The departure may include a case where the vehicle is slipped or turned over (or overturned) due to moving along a curve.

For example, the processor 170 may determine probability that the corresponding vehicle is likely to move out of its driving lane on the basis of at least one of curvature of a curved road surface that the vehicle is currently moving, a state of the road surface, the driving speed of the vehicle and the weight of the vehicle.

Afterwards, in some implementations, when the information sensed through the sensing unit corresponds to a preset condition, the rear lamps are controlled to output visible light to the rear of the vehicle even though the brake apparatus provided in the vehicle is not operated (S620).

Here, the preset condition may refer to a condition that the rear lamps 154 emit light even though the brake apparatus 100 is not operated.

The preset condition may be prestored in the memory 140, 170 or the processor 170 (or controller 770) from the time of producing the control device 100 (or vehicle 700).

Also, the preset condition may be set or changed by a user.

For example, the preset condition may be at least one of whether or not the collision probability with the rear vehicle is more than a reference value, whether or not the collision probability with the front vehicle is more than a reference value, or whether or not a lane departure probability of the currently-driven vehicle is more than a reference value.

However, implementations are not limited to this. The preset condition may include more various conditions.

For example, the present condition may refer to detailed conditions, such as whether the collision probability with the rear vehicle exceeds a first reference or a second reference higher than the first reference, whether the collision probability with the front vehicle exceeds a first reference or a second reference higher than the first reference, whether the lane departure probability of the currently-driven vehicle exceeds a first reference or a second reference higher than the first reference.

As another example, the preset condition may include presence or absence of other vehicles near the vehicle 700, such as whether or not another vehicle is present at the rear of the vehicle 700, whether or not other vehicles are present at both of front and rear sides of the vehicle 700, or whether or not other vehicles are present next the vehicle 700.

Also, the present condition may refer to a condition which is a combination of at least one of the aforementioned conditions.

Various implementations related to the preset condition, namely, various implementations in which the rear lamps are activated even though the brake apparatus is not operated will be described hereinafter with reference to the accompanying drawings.

Meanwhile, the processor 170 may control the rear lamps 154 to output visible light to the rear of the vehicle even though the brake apparatus 100 is not operated, when the information sensed through the sensing unit 160 corresponds to the preset condition.

For example, as illustrated in the upper portion of FIG. 7, the processor 170 may not allow the rear lamps 154 to output visible light when the information sensed through the sensing unit 160 does not meet the preset condition. As an example, not meeting the preset condition may correspond to the collision probability with the rear vehicle being less than a reference value.

As another example, as illustrated in the lower portion of FIG. 7, the processor 170 may control the rear lamps 154 to emit the visible light to the rear of the vehicle 700, even though the brake apparatus 153 is not operated, when the information sensed through the sensing unit 160 meets the preset condition. As an example, meeting the preset condition may correspond to the collision probability with the rear vehicle being greater than a reference value.

In some implementations, when the information sensed through the sensing unit 160 meets the preset condition, the processor 170 may control the rear lamps 154 to emit the visible light even though the brake paddle 500 is not pressed, for example, even though the brake apparatus 153 is not operated.

Also, when the information sensed through the sensing unit 160 meets the preset condition, the processor 170 may control the rear lamps 154 to emit the visible light to the rear of the vehicle 700 even though the brake apparatus 153 is not operated by the AEB system.

Here, the processor 170, for example, may control brake lamps included in the rear lamps 154 to emit the visible light when the information sensed through the sensing unit 160 meets the preset condition.

However, implementations are not limited to this. The rear lamps 154 may include separate light sources which are configured to output visible light to the rear of the vehicle even though the brake apparatus 100 is not operated. Afterwards, when the information sensed through the sensing unit 160 meets the preset condition, the processor 170 may control the separate light sources included in the rear lamps 154 to emit the visible light to the rear of the vehicle.

As described above, when information sensed through the sensing unit meets a preset condition (e.g., when the collision probability of the vehicle is more than the reference value), the rear lamps 154 may be controlled to emit light even though the brake apparatus is not operated. This may result in increasing driving safety of the vehicle, from the ADAS perspective. Also, some implementations may provide a control method that helps prevent a rear-end collision by warning an accident to a rear vehicle in a manner of controlling the rear lamps to emit light even though the brake apparatus is not operated.

Hereinafter, various control methods for emitting light through the rear lamps even though the brake apparatus is not operated will be described with reference to the accompanying drawings.

Figure 8:
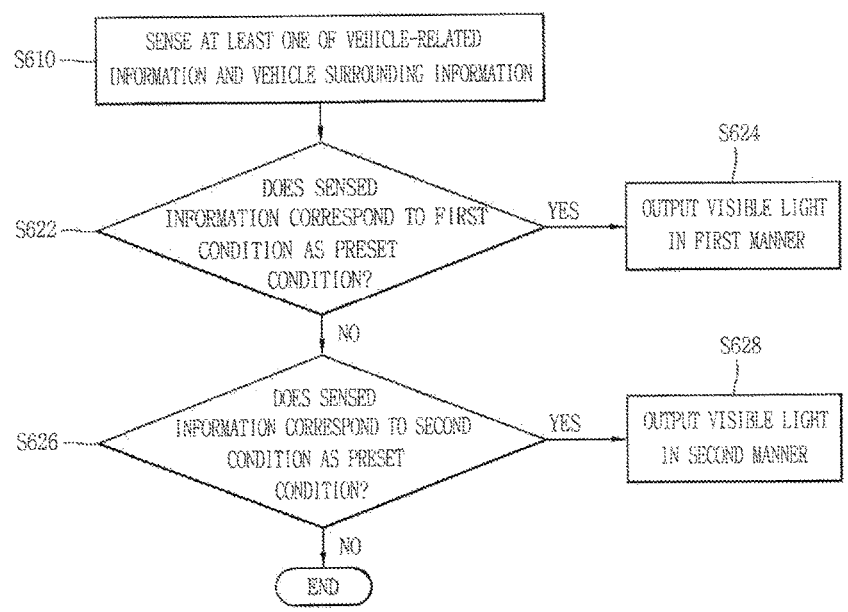
FIG. 8 is a flowchart illustrating an example of controlling rear lamps of a vehicle in accordance with some implementations.
Figure 9A:
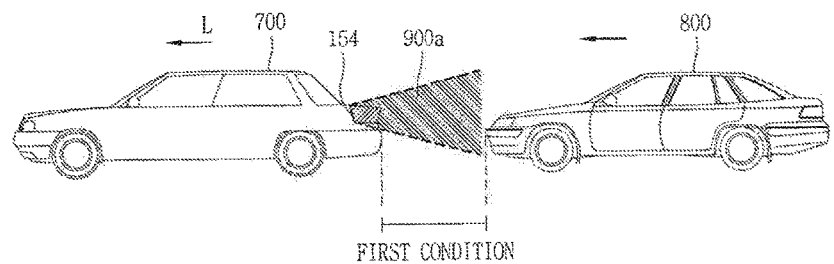
FIGS. 9A and 9B are diagrams illustrating examples of the control of FIG. 8.
Figure 9A:
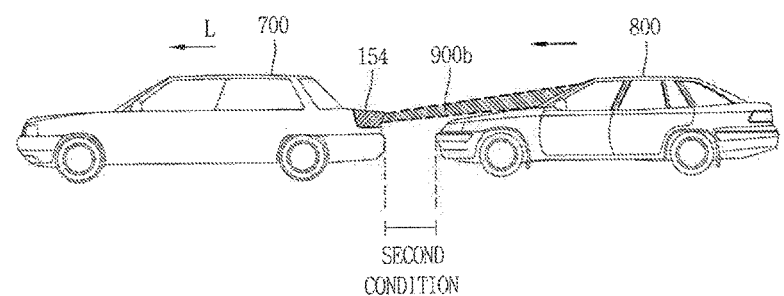
Figure 9B:
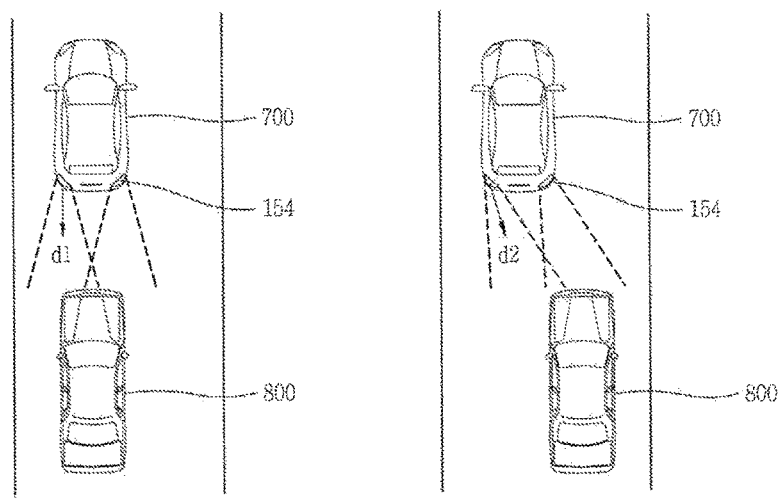

FIG. 8 is a flowchart illustrating an example of controlling rear lamps in accordance with some implementations, and FIGS. 9A and 9B are diagrams illustrating examples of the control method of FIG. 8.

First, as illustrated in FIG. 8, similar to the implementation illustrated in FIG. 6, at least one of the vehicle-related information and the vehicle surrounding information are sensed through the sensing unit 160 (S610). This step will be understood by the description of the step S610 illustrated in FIG. 6, so detailed description thereof will be omitted.

The processor 170 may control the rear lamps 154 to output visible light to the rear of the vehicle although the brake apparatus 153 is not operated, when the sensed information corresponds to a preset condition.

In this instance, the processor 170 may control the rear lamps 154 to output the visible light in a different manner on the basis of different information sensed through the sensing unit 160 in a state the brake apparatus 153 is not operated.

Here, the different information may be information which meets the preset condition which is associated with the emission of the rear lamps in spite of the non-operation of the brake apparatus.

In detail, the processor 170 may determine whether or not the sensed information corresponds to a first condition as the preset condition (S622). Afterwards, the processor 170 may control the rear lamps 154 to output the visible light in a first manner when the information sensed through the sensing unit 160 corresponds to the first condition as the preset conditions (S624).

Meanwhile, the processor 170 may determine whether or not the sensed information corresponds to a second condition, different from the first condition as the preset condition, when the sensed information does not correspond to the first condition (S626).

The processor 170 may control the rear lamps 154 to output the visible light in a second manner, different from the first manner, when the information sensed through the sensing unit 160 corresponds to the second condition, different from the first condition (S628).

In detail, the processor 170 may differently control the rear lamps 154 according to a type of the sensed information (namely, a type of a satisfied condition) when the information sensed through the sensing unit 160 meets a preset condition for controlling the rear lamps 154 to output the visible light without the operation of the brake apparatus 153.

For example, as illustrated in the upper portion of FIG. 9A, when the information sensed through the sensing unit 160 meets a first condition as the preset condition, the processor 170 may control the rear lamps 154 to output the visible light in a first manner 900a. As one example, the first condition may be a case where the collision probability with a vehicle 800 (hereinafter, referred to as 'rear vehicle') sensed from the rear of the vehicle 700 is a first value.

As another example, as illustrated in the lower portion of FIG. 9A, the processor 170 may control the rear lamps 154 to emit the visible light in a second manner 900b, different from the first manner 900a, when the information sensed through the sensing unit 160 corresponds to a second condition, different from the first condition. For example, the second condition may be a case where the collision probability with the rear vehicle 800 is a second value greater than the first value.

FIG. 9A illustrates the example that the visible light output in the first manner or the second manner has a different output angle. However, the visible light output manner of the rear lamp will not be limited to this.

The rear lamps 154 may be configured to output the visible light in various manners.

For example, the processor 170 may control not only the light emission angle of the rear lamps 154, but also at least one of an emitting time point of the rear lamps 154, brightness of emitted light of the rear lamps 154, an emission period of the rear lamps 154, an emitting direction of the rear lamps 154 and a color of emitted light of the rear lamps 154.

The processor 170 may control the rear lamps 154 to output the visible light in the first manner or the second manner which is different from the first manner, by differently controlling at least one (or a combination of more than two) of the light emission angle of the rear lamps 154, the emitting time point of the rear lamps 154, the brightness of emitted light of the rear lamps 154, the emission period of the rear lamps 154, the emitting direction of the rear lamps 154 and the color of emitted light of the rear lamps 154.

As one example, outputting the visible light in the first manner is to output the visible light at a first light emission angle of the rear lamps. On the other hand, outputting the visible light in the second manner is to output the visible light at a second light emission angle, different from the first light emission angle.

As one example, outputting the visible light in the first manner is performed by outputting the visible light at a first light emission time point of the rear lamps, and outputting the visible light in the second manner is performed by outputting the visible light at a second light emission time point, different from the first light emission time point.

As one example, outputting the visible light in the first manner is to output the visible light with a first brightness. On the other hand, outputting the visible light in the second manner is to output the visible light with a second brightness different from the first brightness.

As one example, outputting the visible light in the first manner is to output the visible light at a first light emission period. On the other hand, outputting the visible light inn the second manner is to output the visible light at a different light emission period different from the first emission period.

As one example, outputting the visible light in the first manner is to output the visible light in a first emitting direction. On the other hand, outputting visible light in the second manner is to output the visible light in a second emitting direction different from the first emitting direction.

As one example, outputting the visible light in the first manner is to output the visible light with a first light color. On the other hand, outputting the visible light in the second manner is to output the visible light with a second light color different from the first light color.

Accordingly, the processor 170 may control the rear lamps 154 to output the visible light in the first manner or the second manner, namely, in various manners.

For example, as illustrated in the left-hand portion of FIG. 9B, the processor 170 may control the rear lamps 154 to output the visible light in a first direction d1 when the information sensed through the sensing unit 160 meets a first condition. The first condition, for example, may be a case where the rear vehicle 800 with the collision probability exceeding the reference value is located at a first relative position.

As another example, as illustrated in the right-hand portion of FIG. 9B, the processor 170 may control the rear lamps 154 to output the visible light in a second direction d2, different from the first direction d1, when the information sensed through the sensing unit 160 meets a second condition, different from the first condition. The second condition, for example, may be a case where the rear vehicle 800 with the collision probability exceeding the reference value is located at a second relative position different from the first relative position.

The processor 170 may sense a relative position of the rear vehicle 800 with respect to the vehicle 700 through the sensing unit 160 (e.g., the camera module 200). Afterwards, the processor 170 may control the rear lamps 154 to output the visible light to the rear vehicle based on the sensed relative position.

With the configuration, in some implementations, the rear lamps may be controlled to output the visible light to the rear of the vehicle even without the operation of the brake apparatus when the information sensed through the sensing unit meets the preset condition. As an example, the preset condition may correspond to the collision probability exceeding a reference value.

In addition, some implementations may provide the rear lamps which may be controlled to output the visible light in various manners such that a danger may be notified to the rear vehicle in an improved, optimized, or intuitive manner, and the control device configured to control the rear lamps.

Also, some implementations may provide rear lamps configured to provide a rear vehicle with more intuitively recognizable states of the vehicle or relationships with the vehicle, by being controlled to output the visible light in the different manner according to the type of the condition, such as a preset condition, associated with the emission of the visible light, even without the operation of the brake apparatus, and the control device controlling the rear lamps.

Hereinafter, further examples of implementations will be described with reference to the accompanying drawings.

Figure 10:
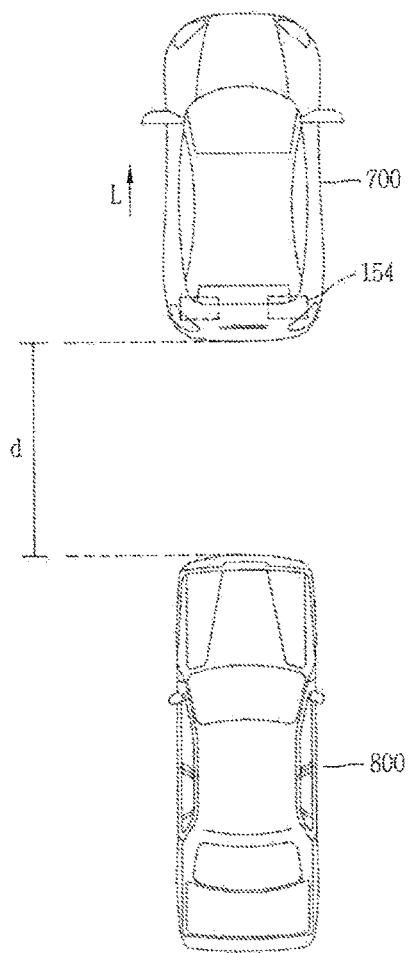
FIGS. 10 and 11 are diagrams illustrating examples of controlling a vehicle according to one implementation.
Figure 11:
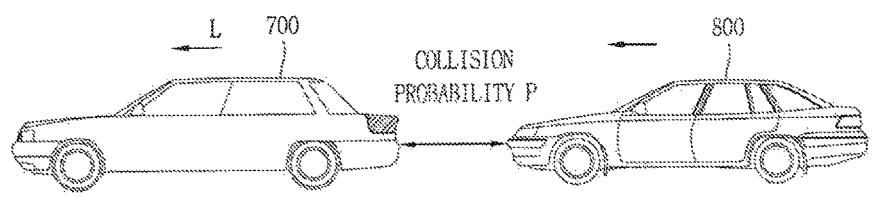
Figure 11:
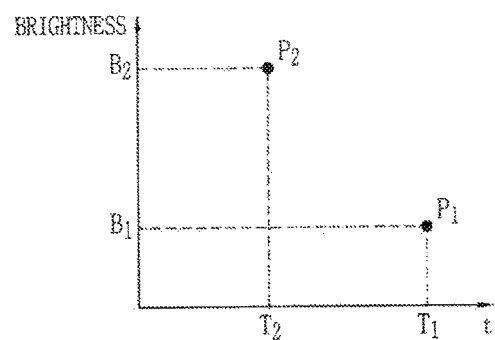

FIGS. 10 and 11 are diagrams illustrating one implementation in accordance with some implementations.

The processor 170 may control the rear lamps 154 to output visible light to the rear of the vehicle even without the operation of the brake apparatus 153, when information (e.g., at least one or a combination of vehicle-related information and vehicle surrounding information) sensed through the sensing unit 160 corresponds to a preset condition.

In this instance, the processor 170 may control the rear lamps 154 to output the visible light, even without the operation of the brake apparatus 153, only when the first vehicle 800 is sensed at the rear of the vehicle 700.

Hereinafter, a vehicle behind the vehicle 700 is referred to as 'rear vehicle' or 'first vehicle.' Here, the vehicle behind the vehicle 700 may include not only a vehicle which is located in a straight line with the vehicle 700 right behind the vehicle 700, but also a vehicle behind the vehicle 700 in a diagonal direction.

For example, the first vehicle (or rear vehicle) 800 may include one or more vehicles detected behind the vehicle 700.

The processor 170 may control the rear lamps 154 to emit light even though the brake apparatus 153 is not operated, when sensed information meets a preset condition, under assumption that the first vehicle 800 is present behind the vehicle 700.

The detection of the first vehicle 800 behind the vehicle 700, for example, may refer to that the first vehicle 800 is sensed at the rear of the vehicle 700 through the sensing unit 160.

For example, the processor 170 may control the rear lamps 154 to output the light even without the operation of the brake apparatus 153, under assumption that the first vehicle 800 is sensed at the rear of the vehicle 700.

According to this implementation, the processor 170 may not control the rear lamps 154 to emit light without the operation of the brake apparatus 153, when the first vehicle 800 is not sensed at the rear of the vehicle 700 although the information sensed through the sensing unit 160 meets the preset condition.

For example, when the information sensed through the sensing unit 160 corresponds to the preset condition and the first vehicle 800 is sensed at the rear of the vehicle 700, the processor 170 may control the rear lamps 154 to emit light even without the operation of the brake apparatus 153.

The processor 170 may determine (decide, sense) presence or absence of the first vehicle 800 behind the vehicle 700 by use of the sensing unit 160.

In detail, the processor 170 may sense whether or not the first vehicle 800 is present within a predetermined distance d from the vehicle 700, by using at least one of an ultrasonic sensor, a radar or a LiADAR included in the sensing unit 160, and the camera 200.

The predetermined distance d may be a distance which may be sensed by a sensor for sensing a vehicle detected behind the vehicle 700.

The predetermined distance d that the sensing unit 160 may sense the rear vehicle may vary according to at least one of a type of a sensor, a characteristic of the sensing unit 160, a surrounding environment and a driving state of the vehicle 700.

The processor 170, as illustrated in FIG. 10, may determine that the first vehicle 800 is present (sensed) behind the vehicle 700 when the first vehicle 800 is sensed through the sensing unit 160 within the predetermined distance d based on the vehicle 700.

The processor 170 may control the rear lamps 154 to output the visible light to the rear of the vehicle 700, even without the operation of the brake apparatus 153, when the information sensed through the sensing unit 160 meets a preset condition only under assumption that the first vehicle 800 is sensed at the rear of the vehicle 700.

Meanwhile, the preset condition may be a case where collision probability with the first vehicle 800 sensed at the rear of the vehicle 700 exceeds a reference value.

In detail, when the collision probability P with the first vehicle 800 sensed at the rear of the vehicle 700 exceeds the reference value, the processor 170 may control the rear lamps 154 to output the visible light even without the operation of the brake apparatus 153.

The processor 170 may calculate a relative distance and a relative speed with the first vehicle 800 sensed at the rear side of the vehicle 700, through the sensing unit 160.

The processor 170 may decide a time to collision (TTC) based on the calculated relative distance and relative speed.

The collision probability P may be decided based on the TTC.

The TTC may refer to a time which is predicted to be taken until the first vehicle 800 sensed at the rear side of the vehicle 700 or a second vehicle 900 sensed from a front of the vehicle 700 collides with the vehicle 700.

For example, the collision probability P may be inversely proportional to the TTC. When the TTC is shorter, the collision probability P may increase more. Also, when the TTC is longer, the collision probability P may be lowered more.

Also, the TTC may be reduced when a relative speed between the rear vehicle and the vehicle 700 is fast, a relative distance between the vehicle 700 and the rear vehicle is short, a weight of the vehicle 700 is great or frictional force of a road surface is weak.

In this instance, the collision probability P may increase when the relative speed between the rear vehicle and the vehicle 700 is fast, the relative distance between the vehicle 700 and the rear vehicle is short, the weight of the vehicle 700 is great or the frictional force of the road surface is weak.

Also, the collision probability may refer to probability that the first vehicle 800 sensed at the rear of the vehicle 700 is to collide with the vehicle 700.

In this instance, that the collision probability exceeds the reference value may refer to that the probability to collide with the first vehicle 800 (rear vehicle) is higher than a preset probability (reference).

For example, the processor 170 may calculate the collision probability or collision risk with the rear vehicle based on information sensed through the sensing unit 160. Also, the processor 170 may control the rear lamps 154 to output the visible light to the rear of the vehicle 700 even without the operation of the brake apparatus 153 when it is determined that the collision probability with the rear vehicle is more than a reference value or the collision risk is more than a predetermined level (e.g., when the collision probability exceeds a reference value).

The reference value, as aforementioned, may be defined based on at least one of the collision probability or collision risk with the first vehicle 800 (rear vehicle) or the TTC.

The reference value may be preset or changed by a user or the processor 170.

Also, the collision probability may vary according to a surrounding state of the vehicle sensed through the sensing unit 160 (e.g., a state of a road surface, frictional force, the weather, a surrounding environment, etc.).

The processor 170 may decide the collision probability P, considering the surrounding state of the vehicle sensed through the sensing unit 160 as well as the TTC.

For example, even though a relative distance with the rear vehicle and a relative speed with the rear vehicle are the same as those of the vehicle 700, when frictional force is reduced due to a wet road surface on which the vehicle 700 is currently driven, the collision probability may increase.

As another example, even though the relative distance with the rear vehicle and the relative speed with the rear vehicle are the same as those of the vehicle 700, when the frictional force of the driving road surface is high, the collision probability may be lowered.

So far, the collision probability has been described in relation to the rear vehicle, but implementations are not limited to this. For example, the description of the collision probability will be equally/similarly applied even to collision probability with the front vehicle 900 sensed at the front side of the vehicle 700.

Some implementations may calculate collision probability that the rear vehicle 800 and the vehicle 700 are to collide with each other and control the rear lamps 154 to output the visible light to the rear of the vehicle even without the operation of the brake apparatus 153 based on the collision probability (e.g., when the collision probability exceeds the reference value).

Meanwhile, the processor 170 may differently control at least one of an emission angle of the visible light of the rear lamps, an emission time point of the rear lamp, brightness of emitted light of the rear lamps, an emission period of the rear lamps, an emitting direction of the rear lamps, and a light color of the rear lamps, on the basis of the collision probability, when the collision probability exceeds the reference value.

The processor 170 may control the rear lamps to emit light at a faster time point than a preset time point when the collision probability is higher.

For example, when the collision probability with the first vehicle 800 sensed at the rear of the vehicle 700 corresponds to P1, as illustrated in FIG. 11, the processor 170 may control the rear lamps 154 to emit the light at a first time point T1 even without the operation of the brake apparatus 153.

Here, the collision probability P1 may be collision probability corresponding to a preset condition that the rear lamps emit light even without the operation of the brake apparatus.

Also, the first time point T1 may be a preset time point, for example. Here, the preset time point may be a time point which is preset such that the rear lamps 154 may emit light even without the operation of the brake apparatus 153 when information sensed through the sensing unit 160 meets a preset condition.

The first time point T1 (preset time point) may be decided (or changed) by the user or under the control of the processor 170.

Meanwhile, when the collision probability with the first vehicle 800 sensed at the rear of the vehicle 700 corresponds to P2 higher than P1, as illustrated in FIG. 11, the processor 170 may control the rear lamps 154 to emit the light at a second time point T2 faster than the first time point T1 (preset time point) even without the operation of the brake apparatus 153.

The processor 170 may control the rear lamp 154 to emit brighter light when the collision probability with the first vehicle 800 sensed at the rear of the vehicle 700 is higher.

In detail, referring to FIG. 11, the processor 170 may control the rear lamps 154 to emit light with a first brightness B1 when the collision probability is the first value P1.

Also, the processor 170 may control the rear lamps 154 to emit light with a second brightness B2 higher than the first brightness B1 when the collision probability is the second value P2 greater than the first value P1.

The processor 170 may control the rear lamps 154 to emit light at a narrower emission angle (or to face a driver of the rear vehicle 800 at a narrower emission angle) when the collision probability with the first vehicle 800 sensed at the rear of the vehicle 700 is higher (this will be understood by equally/similarly applying the description of FIG. 9A.).

Also, the processor 170 may reduce a lighting period (e.g., the emission period of the rear lamps 154) at which the rear lamps 154 are turned on/off when the collision probability with the first vehicle 800 sensed at the rear of the vehicle 700 is high.

The processor may also control the rear lamps 154 to emit light with a color associated with the collision probability on the basis of the collision probability with the first vehicle 800 sensed at the rear of the vehicle 700. For example, when the collision probability is a first value, the rear lamps may output visible light with a first color associated with the first value. On the other hand, when the collision probability is a second value different from the first value, the rear lamps 154 may output visible light with a second color associated with the second value.

The processor 170 may detect a relative position with the first vehicle 800 sensed at the rear of the vehicle 700 through the sensing unit 160. Afterwards, the processor 170 may control an emitting direction of the rear lamps 154 such that visible light may be emitted toward the sensed first vehicle 800 (this will be understood by equally/similarly applying the description of FIG. 9B).

The foregoing description has been given of the example in which the rear lamps 154 emit the visible light even without the operation of the brake apparatus 153 when the collision probability corresponds to a preset condition.

However, implementations are not limited to this. Some implementations may alternatively control the rear lamps in a different manner according to the collision probability with the rear vehicle 800 when the brake apparatus 153 is operated. In this instance, some implementations may control the rear lamps in various manners according to the collision probability with the rear vehicle 800 when the brake apparatus 153 is operated, and the various manners will be equally/similarly understood by the foregoing description.

Also, the control method of the rear lamps according to some implementations may employ various manners without the limit to the aforementioned. For example, if the various manners correspond to the structure of differently controlling the rear lamps according to the collision probability with the rear vehicle, the various manners will be interpreted as belonging within the scope of this disclosure.

As aforementioned, the collision probability may be decided based on the TTC which is decided on the basis of the relative distance and relative speed with the first vehicle 800 sensed at the rear of the vehicle 700.

With the configuration, some implementations may warn the rear vehicle of a risk by turning on the rear lamps even without the operation of the brake apparatus 153, when the collision probability with the rear vehicle exceeds a reference value.

Also, some implementations may warn a driver of the rear vehicle in an improved manner and thus enhance accident prevention by controlling the rear lamps in various manners based on the collision probability exceeding a reference value.

Meanwhile, some implementations may control the rear lamps 154 even without the operation of the brake apparatus 153, by considering a vehicle sensed from the rear of the vehicle 700 and a vehicle sensed from the front of the vehicle 700.

Hereinafter, the related implementation will be described with reference to the accompanying drawings.

Figure 12:
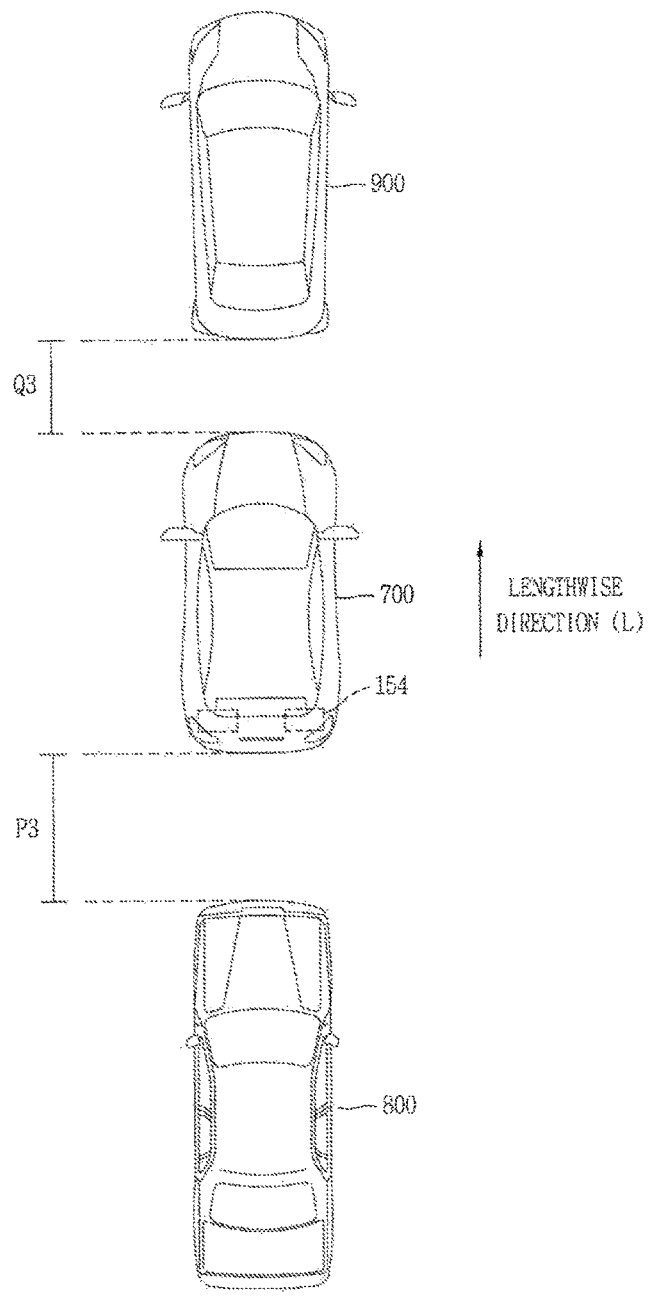
FIGS. 12, 13, and 14 are diagrams illustrating examples of controlling rear lamps, considering other vehicles both ahead of and behind the vehicle, in accordance with some implementations.
Figure 13:
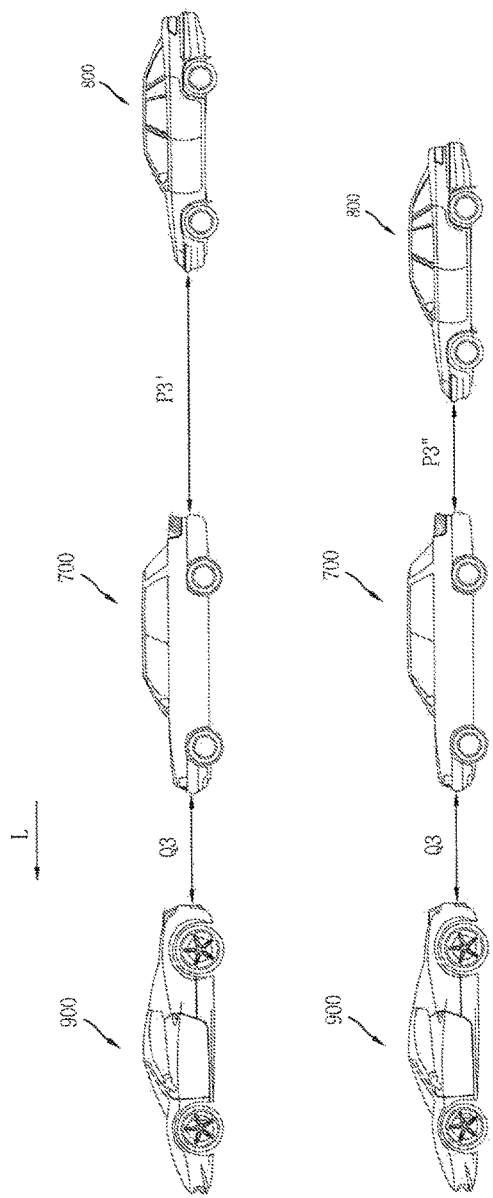
Figure 14:
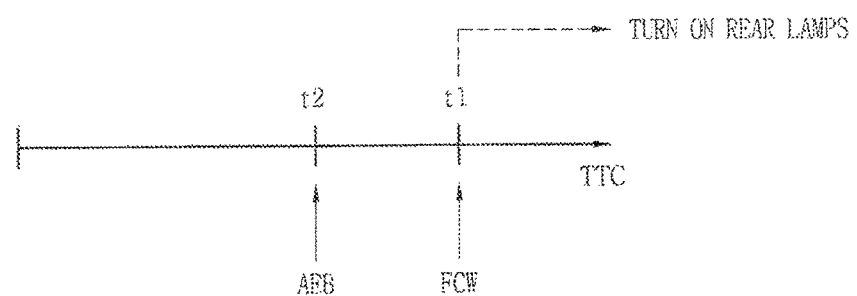

FIGS. 12, 13, and 14 are diagrams illustrating examples of controlling rear lamps, considering both front and rear vehicles.

The processor 170 disclosed herein may control the rear lamps 154 to output the visible light even without the operation of the brake apparatus 153, when vehicles are sensed from rear and front sides of the vehicle 700, respectively.

As aforementioned, the processor 170 may control the rear lamps 154 to emit light even without the operation of the brake apparatus 153 when information sensed through the sensing unit 160 corresponds to a preset condition, under assumption that the first vehicle 800 is sensed at the rear of the vehicle 700.

Meanwhile, as illustrated in FIG. 12, the processor 170 may also consider a second vehicle 900 sensed at the front of the vehicle 700 as well as the first vehicle 800 sensed at the rear of the vehicle 700.

For example, the processor 170 may control the rear lamps 154 to output light even without the operation of the brake apparatus 153 when the information sensed through the sensing unit 160 meets a preset condition (e.g., when information related to the first vehicle 800 sensed at the rear of the vehicle 700 and information related to the second vehicle 900 sensed at the front of the vehicle 700 meet the preset condition).

The following description will be given of various implementations of a case where the second vehicle 900 is sensed at the front of the vehicle 700 after the first vehicle 800 is sensed at the rear of the vehicle 700. For example, even considering the second vehicle 900 sensed at the front of the vehicle 700, in order for the rear lamps 154 to output light even without the operation of the brake apparatus 153, it should be assumed that the first vehicle 800 is sensed at the rear of the vehicle 700.

Referring to FIG. 12, the processor 170 may sense the second vehicle 900 which is present at the front of the vehicle 700, by use of the sensing unit 160.

The second vehicle 900 present at the front of the vehicle 700 may also be referred to as a front vehicle.

The processor 170 may sense information related to the second vehicle 900 using the sensing unit 160. For example, the processor 170 may sense a relative distance between the vehicle 700 and the second vehicle 900 (a relative distance with the second vehicle 900), a relative speed between the vehicle 700 and the second vehicle 900 (a relative speed with the second vehicle 900), and the like, through the sensing unit 160.

Afterwards, the processor 170 may calculate collision probability Q3 with the second vehicle 900, on the basis of the relative distance and the relative speed with the second vehicle sensed at the front of the vehicle 700.

The processor 170 may calculate the relative distance and the relative speed with the second vehicle 900 sensed at the front of the vehicle 700 through the sensing unit 160, and decide the time to collision (TTC) with the second vehicle 900 based on the calculated relative distance and relative speed.

The collision probability Q3 may be decided based on the TTC between the vehicle 700 and the second vehicle 900 (front vehicle).

As aforementioned, the collision probability Q3 with the second vehicle 900 may vary according to a surrounding state (e.g., a state of a road surface, frictional force, the weather, a surrounding environment, etc.) of the vehicle 700 sensed through the sensing unit 160.

The processor 170 may decide the collision probability Q3 by considering both of the TTC and the surrounding state of the vehicle sensed through the sensing unit 160.

Similarly, the processor 170 may sense the first vehicle 800 at the rear of the vehicle 700 through the sensing unit 160, and decide collision probability P3 with the first vehicle 800. The collision probability with the first vehicle 800 (rear vehicle) will be understood by the foregoing description.

Hereinafter, the collision probability P3 with the first vehicle 800 sensed at the rear of the vehicle 700 is referred to as a first collision probability.

Also, the collision probability Q3 with the second vehicle 900 sensed at the front of the vehicle 700 is referred to as a second collision probability.

The processor 170 may decide whether or not to turn on the rear lamps 154 even without the operation of the brake apparatus 153, on the basis of the first collision probability P3 with the first vehicle 800 sensed at the rear of the vehicle 700 and the second collision probability Q3 with the second vehicle 900 sensed at the front of the vehicle 700.

As one example, the processor 170 may control the rear lamps 154 to output light even without the operation of the brake apparatus 153, as illustrated in FIGS. 9A to 11, on the basis of the collision probability with the first vehicle 800 sensed at the rear of the vehicle 700, irrespective of the second vehicle 900 sensed at the front of the vehicle 700.

As one example, as illustrated in FIG. 13, when the second collision probability Q3 with the second vehicle 900 sensed at the front of the vehicle 700 exceeds a reference value, the processor 170 may control the rear lamps 154 to output light even without the operation of the brake apparatus 153, irrespective of the first collision probability P3', P3" sensed at the rear of the vehicle 700.

For example, there may be a case where the collision probability (or a TTC) with the second vehicle 900 sensed at the front of the vehicle 700 is greater than a preset value (e.g., when an accident is inevitable). In this instance, the processor 170 may control the rear lamps 154 to output visible light to the rear of the vehicle 700 even without the operation of the brake apparatus 153, irrespective of the first collision probability between the first vehicle 800 and the vehicle 700, so as to notify a warning signal to the first vehicle 800 sensed at the rear of the vehicle 700.

In detail, when the second collision probability Q3 with the second vehicle 900 sensed at the front of the vehicle 700 exceeds a reference value (e.g., when a preset condition is met), the processor 170 may control the rear lamps 154 to output the visible light to the rear of the vehicle 700 even without the operation of the brake apparatus 153, irrespective of whether the first collision probability with the first vehicle 800 sensed at the rear of the vehicle 700 does not exceed a reference value (P3') or exceeds a reference value (P3").

Meanwhile, when the second collision probability Q3 with the second vehicle 900 sensed at the front of the vehicle 700 exceeds the reference value, the processor 170 may control the rear lamps 154 to output the visible light even without the brake apparatus 153, in response to the first vehicle 800 being sensed at the rear of the vehicle 700. However, implementations are not limited to this. When the second collision probability Q3 exceeds the reference value, the processor 170 may alternatively control the rear lamps 154 to emit the visible light, even without the operation of the brake apparatus 153, although the first vehicle 800 is not sensed at the rear of the vehicle 700.

The processor 170 may differently control at least one of an emission angle of visible light of the rear lamps, an emission time point of the rear lamp, brightness of emitted light of the rear lamps, an emission period of the rear lamps, an emitting direction of the rear lamps, and a light color of the rear lamps, on the basis of the second collision probability with the second vehicle 900 sensed at the front of the vehicle 700.

This will be understood by equally/similarly applying the description of FIG. 11. For example, the processor 170 may reduce the emission angle of the visible light, set the emission time point to an earlier time, increase the brightness of the emitted light, and/or shorten the emission period, when the second collision probability Q3 with the second vehicle 900 is high.

With the configuration, some implementations may provide a control method of preventing a chain collision by controlling the rear lamps to output light even without the operation of the brake apparatus, irrespective of the collision probability with the first vehicle sensed at the rear of the vehicle 700, when the collision probability with the front vehicle exceeds the reference value.

As one example, the processor 170 may sense light output from the second vehicle 900, which is sensed at the front of the vehicle 700, through the sensing unit 160. Here, the light emitted from the second vehicle 900 may be light emitted from brake lamps output from the second vehicle 900.

The processor 170 may also decide a relative distance with the first vehicle 800, which is sensed at the rear of the vehicle 800, through the sensing unit 160.

Afterwards, the processor 170 may control the rear lamps 154 to emit light even without the operation of the brake apparatus 153, when the emission of light from the second vehicle 900 located at the front of the vehicle 700 is sensed and the relative distance with the first vehicle 800 sensed at the rear of the vehicle 700 is within a reference distance (corresponding to a preset condition).

For example, the processor 170 may control the rear lamps 154 to output light even without the operation of the brake apparatus 153 when the relative distance with the first vehicle 800 (rear vehicle) is within the reference distance after visible light output from the brake lamps of the second vehicle (front vehicle) 900 is sensed.

As another example, the processor 170 may control the rear lamps 154 to output light even without the operation of the brake apparatus 153 when the visible light output from the brake lamps (rear lamps) of the second vehicle (front vehicle) 900 is sensed in a state that the relative distance with the first vehicle (rear vehicle) 800 is within the reference distance.

The reference distance may refer to a preset relative distance between the vehicle 700 and the rear vehicle 800 for allowing the rear lamps 154 to output light even without the operation of the brake apparatus 153 when the brake lamps of the front vehicle 900 are turned on (when light emission from the front vehicle is sensed).

The reference distance may be set or varied by a user setting or the processor 170. Also, the reference distance may be decided or varied based on at least one of the collision probability with the first vehicle and the collision probability with the second vehicle.

In this instance, the processor 170 may control the rear lamps 154 to output visible light in a different manner, based on at least one of the second collision probability with the second vehicle (front vehicle) and the first collision probability with the first vehicle (rear vehicle).

For example, the processor 170 may differently control at least one of an emission angle of visible light of the rear lamps, an emission time point of the rear lamp, brightness of emitted light of the rear lamps, an emission period of the rear lamps, an emitting direction of the rear lamps, and a light color of the rear lamps, on the basis of at least one of the second collision probability with the second vehicle (front vehicle) and the first collision probability with the first vehicle (rear vehicle).

This will be understood by equally/similarly applying the foregoing description of FIGS. 11 to 13.

With the configuration, some implementations may reduce an accident occurrence by warning the driver of the rear vehicle before the brake apparatus is operated, when the brake lamps of the front vehicle sensed at the front of the vehicle 700 are turned on under assumption that the rear vehicle sensed at the rear of the vehicle 700 that is within the reference distance.

Meanwhile, the processor 170 of the control device 100 may calculate the second collision probability with the second vehicle 900 sensed at the front of the vehicle 700, based on information sensed through the sensing unit 160.

The processor 170 may output (or generate) a forward collision warning (FCW) when the second collision probability with the second vehicle 900 sensed at the front of the vehicle 700 corresponds to a first value. The forward collision warning may be output through at least one of the output unit 740 of the vehicle 700, the output unit 150 of the control device 100 and the display device 400.

Meanwhile, the processor 170 may operate the brake apparatus 153 to perform the automatic emergency braking (AEB) when the second collision probability corresponds to a second value greater than the first value.

For example, if it is assumed that the second collision probability is the TTC, as illustrated in FIG. 14, the forward collision warning (FCW) may be output when the TTC corresponds to a first time t1. Also, the AEB may be performed when the TTC corresponds to a second time t2 which is shorter than the first time t1.

For example, the processor 170 may output the forward collision warning when the collision probability with the front vehicle corresponds to the first value, and perform the AEB when the collision probability with the front vehicle corresponds to the second value greater than the first value (e.g., increases more).

The processor 170 may sequentially perform the forward collision warning (FCW) and the automatic emergency braking (AEB) as the collision probability increases.

In the related art, when the forward collision warning is output, the rear lamps 154 are not turned on because the brake apparatus 153 is not operated. Also, when the AEB is performed, the rear lamps 154 are turned on because the brake apparatus 153 is operated.

For example, the rear lamps 154 may output light in response to the AEB being performed.

Meanwhile, the processor 170 may control the rear lamps 154 to emit light even without the operation of the brake apparatus 153 at the generation time point of the forward collision warning (FCW), before the AEB is performed, when the first collision probability with the first vehicle 800 sensed at the rear of the vehicle 700 exceeds the reference value.

For example, the processor 170 may control the rear lamps 154 to output visible light to the rear of the vehicle even though the collision probability with the front vehicle corresponds to the first value generating the forward collision warning (e.g., even without the operation of the brake apparatus 153) when the collision probability with the rear vehicle exceeds the reference value.

In this instance, the processor 170 may differently control at least one of an emission angle of visible light of the rear lamps, an emission time point of the rear lamp, brightness of emitted light of the rear lamps, an emission period of the rear lamps, an emitting direction of the rear lamps, and a light color of the rear lamps, on the basis of the first collision probability with the first vehicle 800 sensed at the rear of the vehicle 700 at the generation time point of the forward collision warning (FCW).

This will be understood by equally/similarly applying the foregoing description of FIG. 11.

For example, the processor 170 may reduce the emission angle, set the emission time point to an earlier time, increase the brightness of the emitted light, and/or shorten the emission period, when the first collision probability with the first vehicle 800 increases more at the generation time point of the FCW.

Afterwards, the processor 170 may perform the AEB when the collision probability with the front vehicle (second vehicle) 900 corresponds to the second value in the state that the rear lamps 154 emit light even without the operation of the brake apparatus 153. In this instance, the processor 170 may control the rear lamps 154 to output light with higher brightness than a preset brightness when the AEB is performed.

With the configuration, some implementations may provide a control device configured to warn a risk to a driver of the rear vehicle in advance or at particular time point by controlling the rear lamps to output light even without the operation of the brake apparatus at the generation time point of the forward collision warning (FCW), when the collision probability with the rear vehicle exceeds the reference value although the collision probability with the front vehicle is not as high as having to perform the AEB. In some implementations, the particular time point may be determined to enhance or optimize safety of the vehicle.

Meanwhile, when the FCW is generated in response to the second collision probability with the second vehicle 900 sensed at the front of the vehicle 700 corresponding to the first value in a state that the first vehicle 800 is sensed at the rear of the vehicle 700, the processor 170 may control the rear lamps 154 to output light even without the operation of the brake apparatus 153, irrespective of the first collision probability with the first vehicle 800.

For example, the processor 170 may control the rear lamps 154 to output light even without the operation of the brake apparatus 153, under assumption that the first vehicle 800 is sensed at the rear of the vehicle 700, when the second collision probability with the second vehicle 900 sensed at the front of the vehicle 700 corresponds to the first value generating the FCW.

In this instance, the processor 170 may differently control at least one of an emission angle of visible light of the rear lamps, an emission time point of the rear lamp, brightness of emitted light of the rear lamps, an emission period of the rear lamps, an emitting direction of the rear lamps, and a light color of the rear lamps, on the basis of the second collision probability with the second vehicle 900 (e.g., the TTC with the second vehicle 900) which is calculated from after the generation time point of the FCW.

Besides, the processor 170 may sense an accident occurred at the front of the vehicle 700 through the sensing unit 160 (or the camera module 200) and the communication unit 110.

For example, the processor 170 may sense an accident occurred at the front of the vehicle 700 based on specific information (e.g., information notifying the accident occurred at the front) when the specific information is received from another vehicle, from which an accident has occurred, through the communication unit 110.

When the first vehicle 800 is sensed at the rear of the vehicle 700 after the accident is sensed, the processor 170 may control the rear lamps 154 to output light even without the operation of the brake apparatus 153.

In this instance, the processor 170 may differently control at least one of an emission angle of visible light of the rear lamps, an emission time point of the rear lamp, brightness of emitted light of the rear lamps, an emission period of the rear lamps, an emitting direction of the rear lamps, and a light color of the rear lamps, on the basis of at least one of a relative distance between a sensed accident-occurred location and the vehicle 700, a driving speed of the vehicle 700, the collision probability with the first vehicle 800 and a surrounding state.

Figure 15:
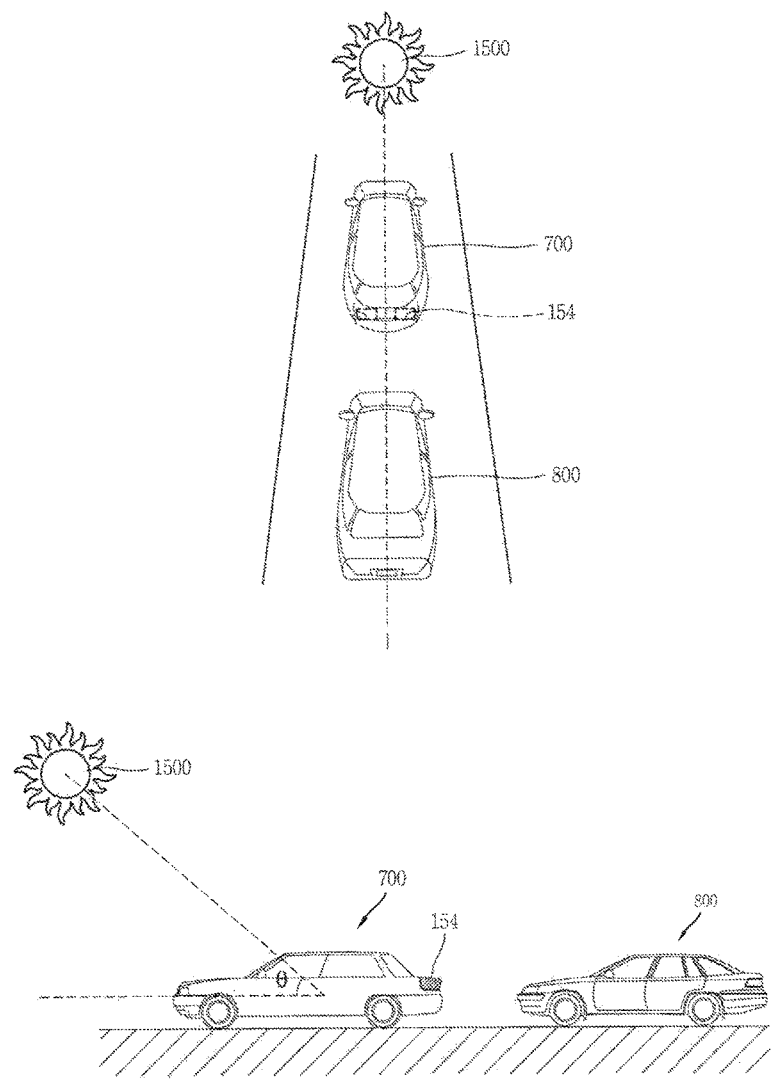
FIG. 15 is a diagram illustrating examples of controlling rear lamps of a vehicle based on an external light source in accordance with some implementations.

Meanwhile, some implementations may variously control the rear lamps according to an external environment. FIG. 15 is a diagram illustrating a method of controlling rear lamps based on an external light source in accordance with some implementations.

As illustrated in FIG. 15, the processor 170 may sense a surrounding state of the vehicle 700 through the sensing unit 160. In this instance, the surrounding state of the vehicle 700 may include a relative location of an external light source 1500 (e.g., the sun, a road lamp, a light source of another vehicle, etc.), brightness (or an amount of light) of the external light source 1500, the weather, light transmittance and the like.

The processor 170 may differently control the brightness of visible light emitted from the rear lamps 154 even without the operation of the brake apparatus 153, on the basis of the location of the first vehicle 800 and the location of the external light source 1500 when the first vehicle 800 is sensed at the rear of the vehicle 700.

For example, as illustrated in the upper portion of FIG. 15, when the external light source 1500, the vehicle 700 and the first vehicle (rear vehicle) 800 are arranged in a straight line, the processor 170 may control the rear lamps 154 to output light with higher brightness than brightness of light that is emitted from the rear lamps 154 when those are not arranged in a straight line.

As another example, as illustrated in the lower portion of FIG. 15, the processor 170 may more increase the brightness of the visible light emitted from the rear lamps 154 even without the operation of the brake apparatus 153, when an angle θ between the external light source 1500 and the driving road surface is smaller based on the vehicle 700. However, implementations are not limited to this, and the processor 170 may increase more the brightness when the angle θ is greater, and the related configuration will be decided or changed by the user.

As another example, when it is sensed through the sensing unit 160 that the vehicle 700 is driven through the mist or in the rain or snow, the processor 170 may differently control the brightness of the visible light output from the rear lamps 154 even without the operation of the brake apparatus 153.

For example, the processor 170 may control the rear lamps 154 to output brighter visible light based on the sensing result.

With the configuration, some implementations may provide the control method that controls the rear lamps to output visible light in an improved or optimized manner, considering the surrounding environment, when the rear lamps emit light even without the operation of the brake apparatus.

The aforementioned control device 100 may be included in the vehicle 700.

Also, the operation or control method of the control device 100 described above may be equally/similarly applied as the operation or control method of the vehicle 700.

For example, a control method of a vehicle, which includes a sensing unit, a brake apparatus, and rear lamps that emit visible light to the rear of the vehicle in response to an operation of the brake apparatus, may include sensing at least one of information related to the vehicle and surrounding information related to the vehicle through the sensing unit, and controlling the rear lamps to output visible light to the rear of the vehicle even without the operation of the brake apparatus when the information sensed through the sensing unit meets a preset condition.

Each of the steps may be performed by the controller 770 provided in the vehicle 700.

Here, the controlling the rear lamps may be configured to control the rear lamps to output the visible light in a different manner, on the basis of different information sensed through the sensing unit, in a state that the brake apparatus is not operated.

In detail, the controlling the rear lamps may be configured to control the rear lamps to output the visible light in a first manner when the information sensed through the sensing unit corresponds to a first condition as the preset condition.

Also, the controlling the rear lamps may be configured to control the rear lamps to output the visible light in a second manner different from the first manner, when the information sensed through the sensing unit corresponds to a second condition different from the first condition as the preset condition.

The aforementioned steps will be understood by equally/similarly applying the description of FIGS. 6 to 9B.

Also, the controlling the rear lamps may be performed under assumption that a first vehicle is sensed at the rear of the vehicle.

Also, the controlling the rear lamps may be configured to control the rear lamps to output the visible light even without the operation of the brake apparatus when other vehicles are sensed at both of the front and rear of the vehicle.

The aforementioned step will be understood by equally/similarly applying the description of FIGS. 10 to 15.

Summarizing this, the vehicle 700 may include the control device 100 that controls the rear lamps to output light even without the operation of the brake apparatus when the information sensed through the sensing unit meets a preset condition.

Also, every function, configuration or control method performed by the control device 100 may be performed by the controller 770 provided in the vehicle 700. For example, every control method described in this specification may also be applied to the control method of the vehicle and the control method of the control device.

Meanwhile, the rear lamps 154 may be configured to output information. For example, the information may be at least one of text, a character, a figure, an image, a video and a page.

The rear lamp 154, for example, may be a device on which information may be output, and implemented by a combination of at least one or at least two of an OLED, an LED and a laser diode (LD).

The processor 170 may output various information through the displayable rear lamps 154.

For example, when the user requests for turning on a turn indicator lamp, the processor 170 may control the rear lamps 154 to output information (text, image or figure) corresponding to the turn-on of the requested turn indicator lamp.

Meanwhile, the processor 170 may output various information through the rear lamps 154 even without the operation of the brake apparatus when information sensed through the sensing unit 160 meets a preset condition.

For example, when the sensed information meets a preset condition (e.g., when collision probability with the rear vehicle exceeds a reference), the processor 170 may output information (e.g., a bar-like figure image) corresponding to a brake lamp even without the operation of the brake apparatus.

When the information corresponding to the brake lamp is output in the form of the bar-like figure image, the processor 170 may output the information in various manners according to a type of the sensed information.

For example, the bar-like figure image may extend in a widthwise direction of the vehicle.

The processor 170, for example, may output the bar-like figure image longer as the collision probability with a rear vehicle (or front vehicle) increases more.

However, implementations are not limited to this, and the information related to the brake lamp may employ various figure images.

The processor 170 may more increase a size of the figure image output through the rear lamps 154 as the collision probability with the rear vehicle or front vehicle increases more, in case where the collision probability with the rear vehicle (or the front vehicle) exceeds a reference value.

Some implementations may include the rear lamps 154 through which information may be output, and may effectively notify collision probability with the vehicle disclosed herein to a user of a rear vehicle, by varying information (figure image) corresponding to a brake lamp as the collision probability with the rear vehicle or front vehicle increases more.

Some implementations may be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described implementations are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A control device comprising:
    a brake apparatus configured to operate a braking function of a vehicle;
    at least one rear lamp configured to output visible light to a rear of the vehicle at least in response to an operation of the brake apparatus;
    a sensing unit configured to sense information related to at least one of the vehicle or a surrounding of the vehicle; and
    at least one processor configured to:
    based on the information sensed through the sensing unit corresponding to a preset condition and a first vehicle being sensed at the rear of the vehicle, control the at least one rear lamp to output the visible light to the rear of the vehicle in a state in which the brake apparatus is not operated,
    wherein the at least one processor is further configured to control the at least one rear lamp to output the visible light in the state in which the brake apparatus is not operated, based on sensing through the sensing unit that light is output from a second vehicle sensed at the front of the vehicle and based on a distance from the first vehicle sensed at the rear of the vehicle being within a reference distance.

2. The control device of claim 1, wherein the at least one processor is further configured to, in the state in which the brake apparatus is not operated, control the at least one rear lamp to change the output of the visible light based on a change in the information sensed through the sensing unit.

3. The control device of claim 2, wherein the at least one processor is further configured to:
    control the at least one rear lamp to output the visible light in a first manner based on the information sensed through the sensing unit corresponding to a first condition as the preset condition, and
    control the at least one rear lamp to output the visible light in a second manner, different from the first manner, based on the information sensed through the sensing unit corresponding to a second condition as the preset condition, different from the first condition.

4. The control device of claim 1, wherein the at least one processor is further configured to, based on a probability of collision with the first vehicle sensed at the rear of the vehicle exceeding a reference value, control the at least one rear lamp to output the visible light in the state in which the brake apparatus is not operated.

5. The control device of claim 4, wherein the at least one processor is configured to, based on the probability of collision with the first vehicle sensed at the rear of the vehicle exceeding the reference value, control the at least one rear lamp to output the visible light in the state in which the brake apparatus is not operated by:
    controlling, based on the value of the probability of collision with the first vehicle, at least one of an emission angle of visible light of the at least one rear lamp, an emission time point of the at least one rear lamp, a brightness of emitted light from the at least one rear lamp, an emission period of the at least one rear lamp, an emitting direction of the at least one rear lamp, or a color of emitted light from the at least one rear lamp.

6. The control device of claim 5, wherein the at least one processor is further configured to:

control the at least one rear lamp to output the visible light at a first emission time point based on the probability of collision with the first vehicle being a first value, and
control the at least one rear lamp to output the visible light at a second emission time point that is earlier than the first emission time point based on the probability of collision with the first vehicle being a second value that is greater than the first value.

7. The control device of claim 5, wherein the at least one processor is further configured to:
control the at least one rear lamp to output the visible light with a first brightness based on the probability of collision with the first vehicle being a first value, and
control the at least one rear lamp to output the visible light with a second brightness that is greater than the first brightness based on the probability of collision with the first vehicle being a second value greater than the first value.

8. The control device of claim 4, wherein the at least one processor is further configured to:
calculate a relative distance and a relative speed with the first vehicle through the sensing unit, and
determine a time to collision (TTC) based on the calculated relative distance and the calculated relative speed,
wherein the probability of collision with the first vehicle is determined based on the determined time to collision.

9. The control device of claim 1, wherein the at least one processor is configured to, in the state in which the brake apparatus is not operated, control the at least one rear lamp to output the visible light based on at least one other vehicle being sensed at both of a front side and a rear side of the vehicle.

10. The control device of claim 9, wherein the at least one processor is further configured to determine whether to control the at least one rear lamp to output the visible light in the state in which the brake apparatus is not operated based on a first probability of collision with the first vehicle sensed at the rear of the vehicle and a second probability of collision with a second vehicle sensed at the front of the vehicle.

11. A control device comprising:
a brake apparatus configured to operate a braking function of a vehicle;
at least one rear lamp configured to output visible light to a rear of the vehicle at least in response to an operation of the brake apparatus;
a sensing unit configured to sense information related to at least one of the vehicle or a surrounding of the vehicle; and
at least one processor configured to:
based on the information sensed through the sensing unit corresponding to a preset condition and at least one other vehicle being sensed at both of a front side and a rear side of the vehicle, control the at least one rear lamp to output the visible light to the rear of the vehicle in a state in which the brake apparatus is not operated,
wherein the at least one processor is configured to control the at least one rear lamp to output the visible light in the state in which the brake apparatus is not operated, irrespective of a first probability of collision with the first vehicle sensed at the rear of the vehicle, based on a second probability of collision with the second vehicle sensed at the front of the vehicle exceeding a reference value.

12. The control device of claim 10, wherein the at least one processor is further configured to:
generate a forward collision warning based on the second probability of collision with the second vehicle sensed at the front of the vehicle corresponding to a first value, and
perform an automatic emergency braking based on the second probability of collision corresponding to a second value greater than the first value,
wherein the at least one rear lamp is configured to output the visible light in response to the automatic emergency braking being performed, and
wherein the at least one processor is configured to, in the state in which the brake apparatus is not operated and based on the first probability of collision with the first vehicle sensed at the rear of the vehicle exceeding a reference value, control the at least one rear lamp to output the visible light at a time point at which the forward collision warning is generated prior to the automatic emergency braking is performed.

13. The control device of claim 12, wherein the at least one processor is configured to, in the state in which the brake apparatus is not operated and based on the first probability of collision with the first vehicle sensed at the rear of the vehicle exceeding the reference value, control the at least one rear lamp to output the visible light at the time point at which the forward collision warning is generated by:
controlling, based on of the first probability of collision with the first vehicle sensed at the rear of the vehicle, at least one of an emission angle of visible light of the at least one rear lamp, an emission time point of the at least one rear lamp, a brightness of emitted light of the at least one rear lamp, an emission period of the at least one rear lamp, an emitting direction of the at least one rear lamp, or a color of emitted light of the at least one rear lamp.

14. The control device of claim 1, wherein the at least one processor is configured to, based on the information sensed through the sensing unit corresponding to the preset condition and the first vehicle being sensed at the rear of the vehicle, control the at least one rear lamp to output the visible light to the rear of the vehicle by:
controlling a brightness of the visible light output from the at least one rear lamp based on a location of the first vehicle and based on a location of an external light source.

15. A vehicle comprising a control device according to claim 1.

16. A method for controlling a vehicle comprising a sensing unit, a brake apparatus, and at least one rear lamp configured to emit visible light to a rear of the vehicle in response to an operation of the brake apparatus, the method comprising:
sensing, through the sensing unit, information related to at least one of the vehicle or a surrounding of the vehicle; and
controlling the at least one rear lamp to output visible light to the rear of the vehicle in a state in which the brake apparatus is not operated based on the information sensed through the sensing unit corresponding to a preset condition and a first vehicle being sensed at the rear of the vehicle,
wherein the method further comprises:
controlling the at least one rear lamp to output the visible light in the state in which the brake apparatus is not operated, based on sensing through the sensing unit that light is output from a second vehicle sensed at the front of the vehicle and based on a distance from the first vehicle sensed at the rear of the vehicle being within a reference distance.

17. The method of claim 16, wherein controlling the at least one rear lamp to output the visible light to the rear of the vehicle in the state in which the brake apparatus is not operated based on the information sensed through the sensing unit corresponding to the preset condition and the first vehicle being sensed at the rear of the vehicle comprises:
controlling the at least one rear lamp to change the output of the visible light based on a change in the information sensed through the sensing unit.

18. The method of claim 17, wherein controlling the at least one rear lamp to output the visible light to the rear of the vehicle in the state in which the brake apparatus is not operated based on the information sensed through the sensing unit corresponding to the preset condition and the first vehicle being sensed at the rear of the vehicle comprises:
controlling the at least one rear lamp to output the visible light in a first manner based on the information sensed through the sensing unit corresponding to a first condition as the preset condition, and
controlling the at least one rear lamp to output the visible light in a second manner, different from the first manner, based on the information sensed through the sensing unit corresponding to a second condition different from the first condition.

19. The control device of claim 16, wherein controlling the at least one rear lamp to output the visible light to the rear of the vehicle in the state in which the brake apparatus is not operated based on the information sensed through the sensing unit corresponding to the preset condition and the first vehicle being sensed at the rear of the vehicle comprises:
controlling the at least one rear lamp to output the visible light, in the state in which the brake apparatus is not operated, based on at least one other vehicle being sensed at both of a front side and a rear side of the vehicle.

* * * * *